Feb. 23, 1965 R. W. GALKE ETAL 3,170,651

TAPE RECORDER

Filed July 10, 1961 8 Sheets-Sheet 1

INVENTORS
RALPH W. GALKE
EUGENE J. POLLEY
RICHARD L. ROST

BY Francis W. Crotty
ATTORNEY

INVENTORS
RALPH W. GALKE
EUGENE J. POLLEY
RICHARD L. ROST
BY Francis W. Crotty
ATTORNEY Feb. 23, 1965 R. W. GALKE ETAL 3,170,651

TAPE RECORDER

Filed July 10, 1961 8 Sheets-Sheet 3

INVENTORS
RALPH W. GALKE
EUGENE J. POLLEY
RICHARD L. ROST

BY Francis W. Crotty
ATTORNEY

INVENTORS
RALPH W. GALKE
EUGENE J. POLLEY
RICHARD L. ROST

BY Francis W. Crotty
ATTORNEY

INVENTORS
RALPH W. GALKE
EUGENE J. POLLEY
RICHARD L. ROST
BY Francis W. Crotty
ATTORNEY INVENTORS
RALPH W. GALKE
EUGENE J. POLLEY
RICHARD L. ROST
Francis W. Crotty
ATTORNEY

TAPE RECORDER

Filed July 10, 1961 8 Sheets-Sheet 7

INVENTORS
RALPH W. GALKE
EUGENE J. POLLEY
RICHARD L. ROST
BY Francis W. Crotty
ATTORNEY INVENTORS
RALPH W. GALKE
EUGENE J. POLLEY
RICHARD L. ROST
BY Francis W. [signature]
ATTORNEY United States Patent Office 3,170,651
Patented Feb. 23, 1965

3,170,651
TAPE RECORDER
Ralph W. Galke, Bellwood, Eugene J. Polley, Lombard, and Richard L. Rost, Barrington, Ill., assignors to Zenith Radio Corporation, a corporation of Delaware
Filed July 10, 1961, Ser. No. 122,715
8 Claims. (Cl. 242—55.12)

This invention relates to recording and reproducing devices. More specifically, it relates to apparatus for automatically playing one or a plurality of record-bearing members, such as tapes, each respectively housed in a separate cartridge.

There are numerous types of recording and reproducing equipment available and they may be readily divided into two basic classes. In the first class there are those devices which employ two interchangeable reels and have a transport mechanism which moves the record, be it tape or wire, from reel to reel. In the second class there are those devices which employ magazines containing the records. The simplest of devices of the latter class employs a cartridge containing both a supply reel having the record wound thereon and a take-up reel for receiving the record as it is being played. A preferred device of the magazine type utilizes cartridges, individually having a record wound upon a supply reel therein, in conjunction with a single take-up reel serving all cartridges that are played.

Almost all of the machines which utilize the reel to reel transport mechanism require that the operator thread the tape through the transport mechanism and rewind the tape after it has been played. Furthermore, most of the machines will only accept one reel at a time. After a reel has been played it must be rewound, removed, and a new reel inserted and threaded through the machine.

The machines that use the two-reel type cartridge eliminate some of the problems of the reel to reel type machine, but the cartridge must be rewound by the operator or played in the reverse direction to get back to the beginning of the first selection on the tape. Each cartridge must be removed from the machine after playing and a new cartridge inserted. Moreover, cartridges containing two reels are necessarily large and are cumbersome to handle and store.

With the development of a recording cartridge containing only a supply reel which is approximately the size of a folded handkerchief, it has been possible to construct a recording and reproducing device for such cartridges which eliminates many of the previously mentioned undesirable characteristics of prior recording apparatus.

In the copending applications of Richard G. Schmid, Serial No. 122,929, filed July 10, 1961, now Patent No. 3,136,646, Richard L. Rost, Serial No. 122,916, filed July 10, 1961, now Patent No. 3,105,645, Eugene J. Polley et al., Serial No. 122,930, filed July 10, 1961, now Patent No. 3,105,646, Maurice E. Hardy, Serial No. 122,934, filed July 10, 1961, and Maurice E. Hardy et al., Serial No. 122,933, filed July 10, 1961, all filed concurrently with this application and assigned to the same assignee as the present invention, there are described and claimed devices and apparatus which are closely related to the present invention.

It is a primary object of the present invention to develop apparatus which overcomes or minimizes the aforenoted deficiencies and disadvantages of prior recording and reproducing apparatus.

It is a further object of this invention to provide new and improved self-threading reeling apparatus which automatically plays a plurality of pre-recorded tapes or wires contained in individual cartridges.

It is also an object of this invention to provide a new and simplified sensing mechanism which automatically controls the operation of the recording and reproducing device.

Another object of this invention is to provide an automatic reset mechanism for realigning the sensing mechanism in the event of malfunctioning in the transportation of tape.

It is a further object of this invention to provide tape recording apparatus which is both inexpensive to manufacture and utilizes a minimum number of components.

In accordance with the invention the reeling apparatus has a simplified sensing arrangement for controlling the programming of the apparatus. More specifically, the reeling apparatus for winding a continuous flexible tape comprises a support member for receiving a storage reel for the tape, a take-up reel, and a transport mechanism for moving the tape between the storage and take-up reels. The reeling apparatus further comprises sensing means for continuously indicating the difference in the number of turns of the tape on the storage and take-up reels independently of the thickness of said tape, the sensing means having an operating cycle containing a single reference point, corresponding to a maximum difference in the number of turns, which it assumes at the start and at the termination of the cycle. The apparatus also comprises driving means for actuating the sensing means concurrently with the operation of the transport mechanism and means coupled to and controlled by the sensing means for controlling the operation of the transport mechanism.

In one aspect of the invention, the sensing device includes a control member, such as a lead screw, movable along a given path and at least one switch actuator coupled to that lead screw to effect control of the transport mechanism as it attains particular positions along the path of movement of the lead screw. Further, the lead screw is driven along that path in accordance with differential speed of the supply and take-up reels.

In further agreement with the invention, the transport mechanism has a multi-step operating cycle in the execution of which the tape is transferred from the storage to the take-up reels and returned to the storage reel. A programming mechanism initiates an operating cycle of tape transport and controls the transport in the execution of its operating cycle. There are means for intercoupling the transport and programming mechanism with a predetermined correlation therebetween during intervals of normal operating conditions but subject to assuming an improper correlation in the face of an abnormal operating condition of the apparatus. Finally, there are means for confirming said predetermined correlation each time said transport mechanism attains a predetermined step in its operating cycle.

In a particular embodiment of the invention utilizing a single control member or lead screw movable along a given path, as stated above, proper correlation of the programming and transport mechanisms is assured by confirming the location of the lead screw to a reference position along its path of movement at the start of each operating cycle of the transport mechanism.

The features of this invention which are believed to be novel are set forth with particularity in the appended claims. The invention, together with further objects and advantages thereof, may best be understood, however, by reference to the following description taken in conjunction with the accompanying drawings, in the several figures of which like reference numerals identify like elements, and in which:

Figure 1:
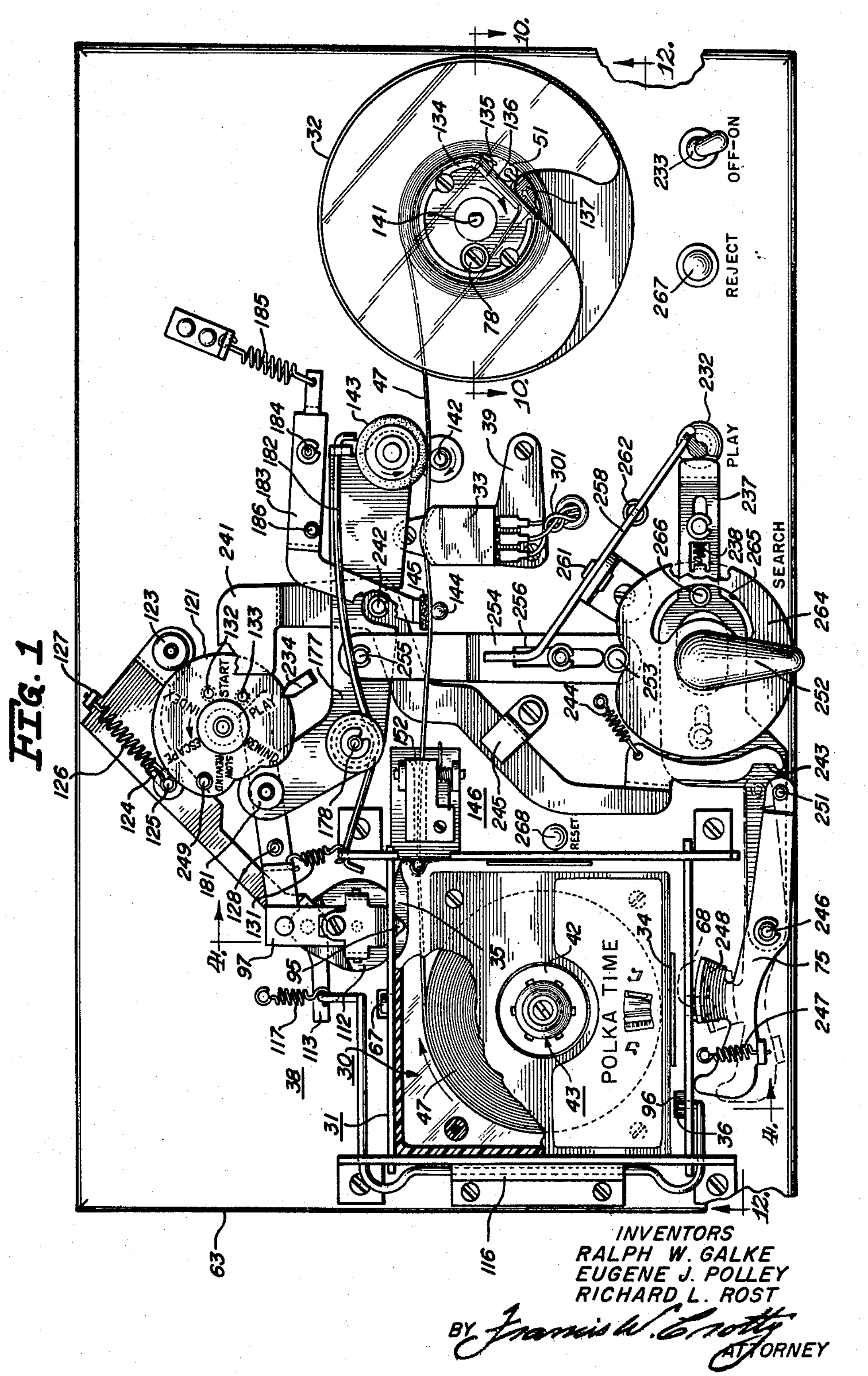
FIGURE 1 is a plan view of the apparatus embodying the invention.

The apparatus of FIGURE 1 may be used for transcribing tape, wire or other flexible recording media but, as illustrated, is employed for recording and reproducing on tape. The arrangement is a tape deck or transport which has, as major component parts, one or more cartridges 30 of tape, a storage bin 31 for accommodating such cartridges and a feeding mechanism 38 to present the cartridges seriatim to a playing position, a take-up arrangement including a reel 32 through which tape is presented in coupling or reading relation to a magnetic transducer head 33. a driving system to effect winding of the tape as between the supply and take-up reels, and a programming arrangement through which the several functions are properly correlated in a playing cycle. For convenience, these major components will be considered individually and in the recited order after which a resumé of the overall operation will be given.

*Tape cartridge*

Figures 2, 3, 4:
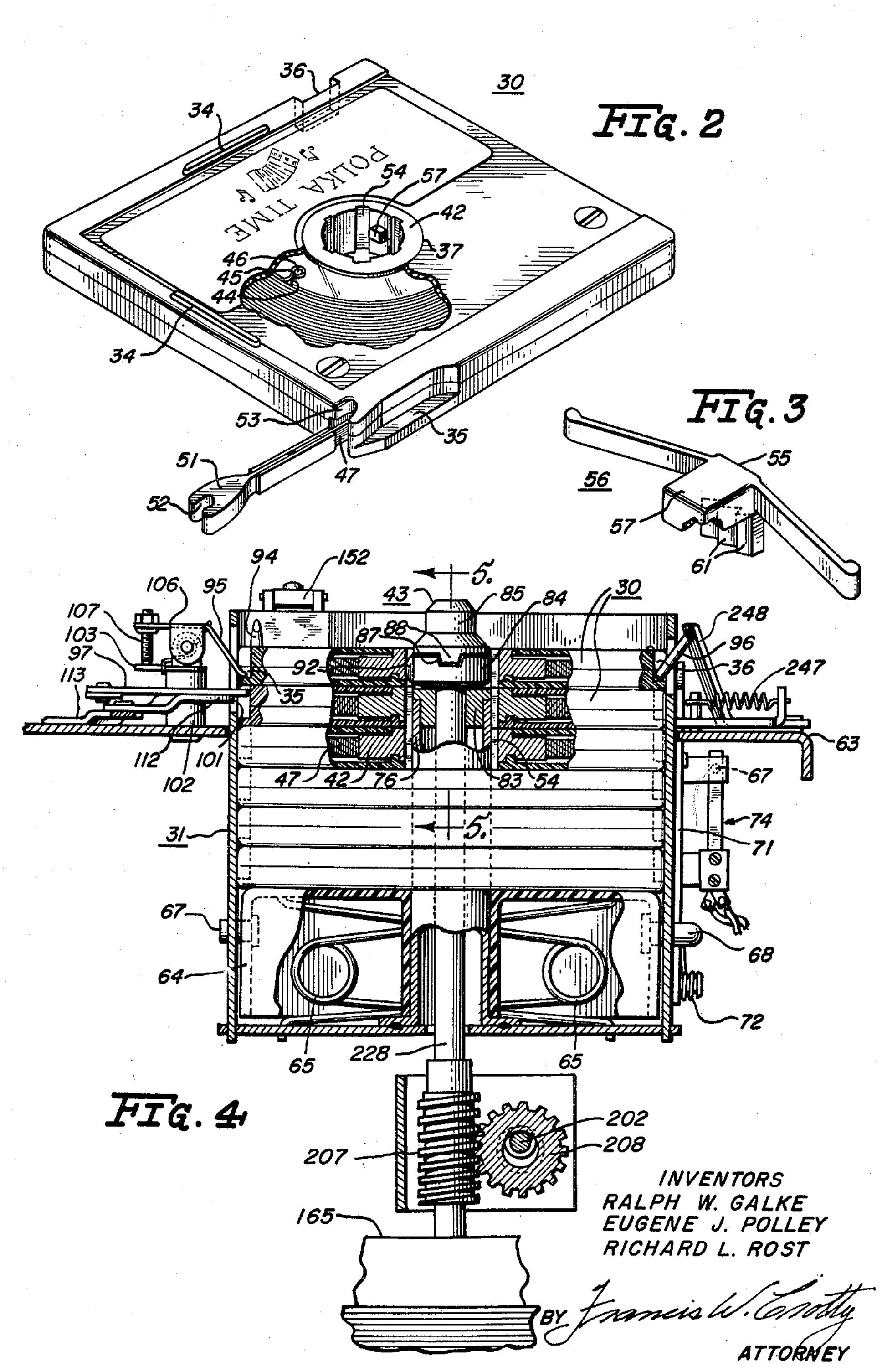
FIGURE 2 is a perspective view of the cartridge of the type preferably employed with the apparatus of FIGURE 1.
FIGURE 3 is a perspective view of a braking device housed within the cartridge of FIGURE 2.
FIGURE 4 is a cross-sectional view taken along lines 4—4 of FIGURE 1.

The tape cartridge 30 may take any of a variety of specifically different configurations, a suitable one being represented in FIGURE 2. In addition to being a vehicle for program tape, the cartridge is to satisfy other important requirements. Since it is contemplated that the machine may accommodate one or a series of cartridges within storage bin 31, the abutting or contiguous surfaces of successive cartridges arranged in a stack should preferably have provisions to facilitate their nesting with respect to one another in a stable stack. It is further desirable that the cartridge be formed to facilitate the sequential feed of a group of cartridges to a playing position within bin 31 and additionally it is preferred that the cartridge have a brake which precludes the unwinding of the tape when the cartridge is stored.

As represented, the cartridge is formed of a pair of essentially rectangular rigid plates with a peripheral flange of such depth that the plates, superposed with their flanges in meeting engagement, define a cavity to accommodate the desired number of convolutions of a magnetic tape of a specified width. Machine screws may retain the plates in assembled relation. The projections 34 on the top surface of one cartridge face may be received by complementary recesses in the bottom surface of a like cartridge stacked on top of that illustrated in order to achieve an interlocking of the cartridges in a stack. The cartridge plates have a formed section at one side to define a shelf 35 which adapts the cartridge to a sequential feed mechanism presently to be considered. For balancing purposes, a generally similar shelf 36 is formed in the diametrically opposite portion of the cartridge. Each of the plates of the cartridge has a centrally located aperture; aperture 37 of one plate is larger than aperture 41 of the other as shown more clearly in FIGURE 5. A hub 42 is interposed between the plates with a reduced diameter section thereof received within aperture 37. The inner diameter of the hub corresponds to the diameter of plate aperture 41 and they collectively define a channelway for accepting a spindle assembly 43, that is, for permitting the cartridge to be threaded over a spindle within storage bin 31.

The hub 42 is rotatably supported within the cartridge and convolutions of the tape material are coiled thereabout. In order to affix the inner end of the tape, hub 42 has a slot 44 leading to a hole 45. The innermost end of the tape may be inserted through the slot into the hole and locked in place by the insertion of a pin 46. The free end of the magnetic tape 47 terminates in a coupler 51 which appears clearly in FIGURE 2 where, for purposes of illustration, a short section of tape 47 is shown withdrawn from the confines of the cartridge. The coupler has a bifurcated configuration which defines a channelway 52 into which a mating coupler, hereinafter referred to as an extractor, may be inserted to couple tape 47 to a take-up reel. Normally, the tape is completely confined within the cartridge with channelway 52 in alignment with a similar channelway 53 formed in the corner of the cartridge.

As illustrated in FIGURE 2, the inner periphery of hub 42 bears a series of formed slots or keyways 54 which are the means through which a mechanical driving connection may be completed to the hub from a driving spindle.

Figure 5:
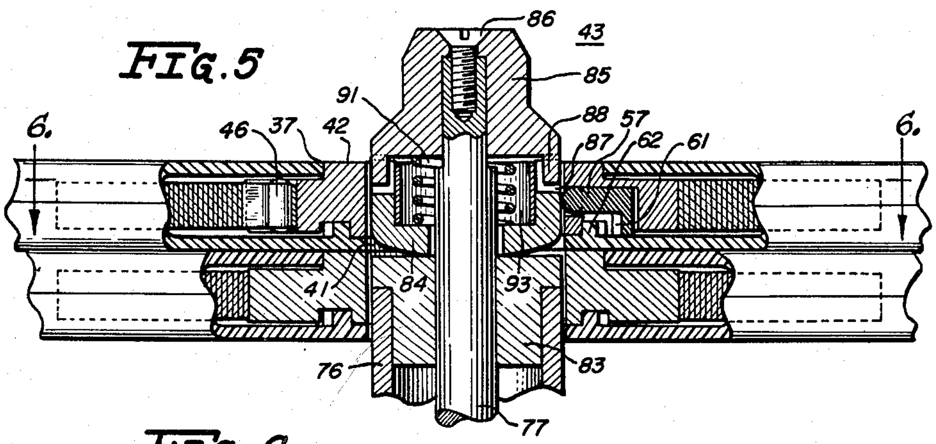
FIGURE 5 is a cross-sectional view taken along lines 5—5 of FIGURE 4.
Figure 6:
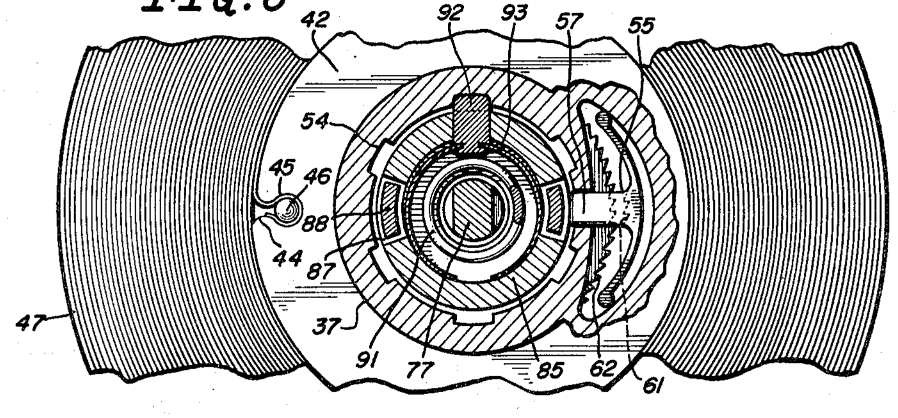
FIGURE 6 is a partial cross-sectional view taken along lines 6—6 of FIGURE 5.

A braking mechanism is constructed within the cartridge to the end that the wound tape will not release or unwind; the details of the brake are revealed in FIGURES 3, 5 and 6. A portion of hub 42 is relieved or cut-away to accommodate the head 55 of a T-shaped locking element 56 which has a transverse section 57 and a channelway is formed in hub 42 through which section 57 projects as shown in FIGURE 2. A series of teeth 61 are formed in the locking element close to the meeting place of its sections 55 and 57 as shown in FIGURE 3. Element 56 is so held in hub 42 that these teeth normally engage with teeth formed on an inwardly projecting annular surface or flange 62 of one of the cartridge plates to lock the hub against rotation. However, by pushing on portion 57 of locking element 56 these teeth may be disengaged and the hub released. The head portions 55 of the locking element are resilient so that during intervals in which the teeth are released portions 55 urge them back into locking engagement. The locking engagement of the teeth is released when the cartridge is mounted over a spindle such as that contained in storage bin 31. The recess in hub 42 which houses locking element 56 may be provided with a cover plate (not shown) to keep the assembly together.

*Storage bin*

The storage bin is secured to deck 63 and is a generally rectangular cylinder dimensioned and formed to accept one or more cartridges 30 with the cartridges horizontally disposed as represented in FIGURE 4. The cylinder is open at the top and has a platform 64 disposed opposite that opening. The platform is normally biased in the direction of the open end by springs 65 and recedes toward the bottom of the well as cartridges are loaded into the bin. Opposed sides of the bin have a vertically disposed slot 66 which shows clearly in FIGURE 7. Pins 67 and 68 extend horizontally from depending flange sections of platform 64 and ride in these slots, using them as guides for the platform movement.

Figure 12:
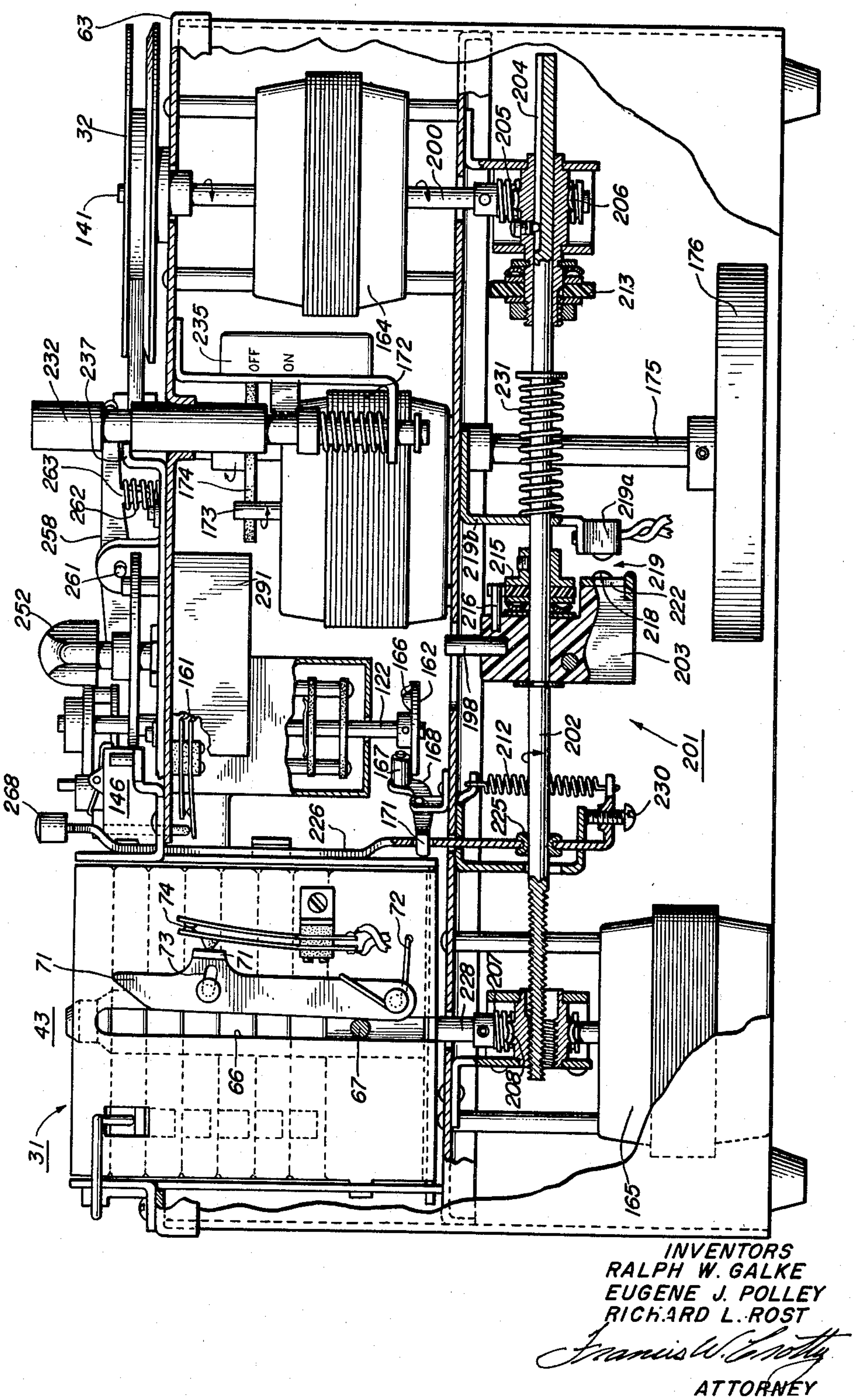
FIGURE 12 is a partial cross-sectional view taken along lines 12—12 of FIGURE 1.

It is appropriate to provide a lock out circuit which prevents the operation of the tape deck in the absence of a cartridge at the playing level within bin 31. For that purpose, a switch operating lever 71 is supported on a side wall of the bin and urged into the path of travel of pin 67 by a spring 72 as shown in FIGURE 12. The switch lever is confined to a limited path of displacement by a pin and slot arrangement 73. A projection of lever 71 may abut an insulating projection affixed to the movable blade of a switch pair 74. The free end of lever 71 is canted to constitute a cam surface in order that the lever may be actuated in accordance with the displacement of pin 67.

When the bin is empty and springs 65 displace platform 64 to its highest position within the bin, pin 67 is positioned adjacent the tapered end of the lever 71 but is out of contact therewith because of the limited displacement permitted of this lever by pin and slot 73. When a single cartridge is inserted into the bin and depressed to the playing level, which causes platform 64 to be depressed a like amount, pin 67 rides over the wide end of the tapered termination of lever 71 displacing it to the position shown in FIGURE 12. This closes contact pair 74 and prepares the transport for operation at least so far as this switch pair is concerned.

The pin 67 operates lever 71 as just described and also displaces a cam lever 75 to accomplish automatic shut off in a manner to be explained hereinafter.

*Spindle assembly*

In addition to serving as a container for the cartridges, bin 31 accommodates the spindle assembly 43 through which the hub of the cartridge in the playing position may be driven. The spindle assembly has a sleeve portion 76 shown in FIGURES 4 and 5 which extends throughout most of the depth of the bin, passing through a centrally located aperture in platform 64 to permit axial movement of the platform relative to the spindle. A drive spindle 77 is positioned within sleeve 76.

Stationary sleeve 76 is terminated at its upper end in a bearing 83 which has a centrally disposed aperture for receiving drive spindle 77. The upper surface of element 83 defines the general location of the playing position of cartridges within the storage bin. Disposed immediately above the bearing surface of element 83 is a collar 84 and a cap 85 is placed over this collar. The cap is connected to the end of drive spindle 77 through a machine screw 86 and its end is tapered to facilitate threading cartridges thereover. The periphery of collar 84 contiguous to end cap 85 has spaced opposed recesses 87 which receive a pair of depending drive fingers 88 extending downwardly from cap 85. This establishes a mechanical coupling from spindle 77 through cap 85 to collar 84 and slots 87 are slightly wider than drive fingers 88 so that there is a relatively free driving connection between them. The obverse face of collar 84 is curved to rest on the bearing surface of element 83.

With this driving connection, cap 85 rotates collar 84 and at the same time permits movement of the collar about its curved bottom surface in a plane substantially transverse to the rotational axis of the drive spindle which contributes a self-aligning feature and permits the mechanism to accommodate cartridges which may have imperfections that, in the absence of this freedom of transverse motion, would tend to bind and stall the machine. A coil spring 91 interposed within collar 84 and cap 85 urges the collar into coaxial alignment with spindle 77.

Figure 7:
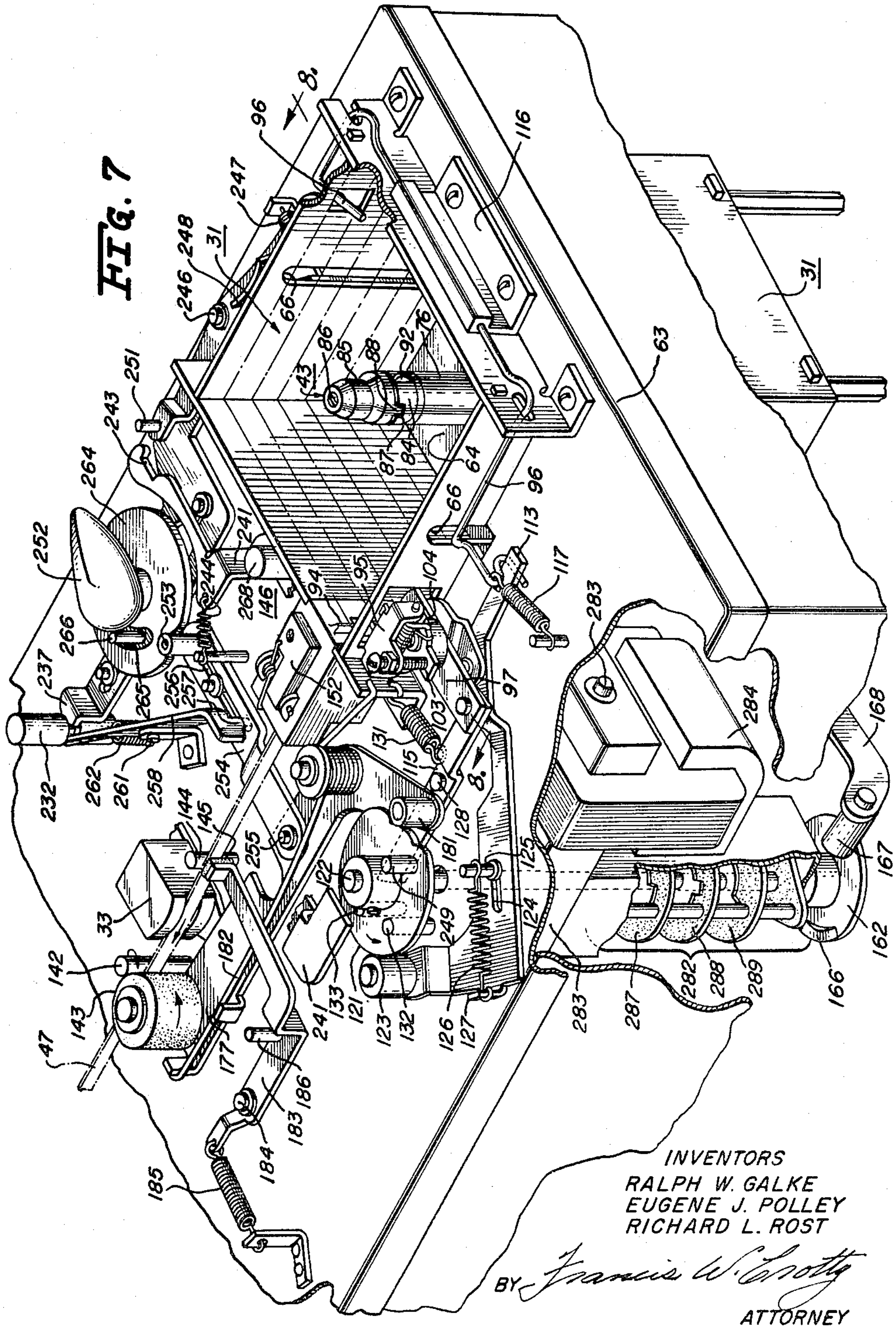
FIGURE 7 is a fragmentary perspective view of the apparatus shown in the plan view of FIGURE 1.

The described driving connection is extended from collar 84 to hub 42 of the cartridge instantaneously in the playing position by means of a pin 92 affixed to the collar and accepted by one of the slots 54 of the cartridge hub as shown in FIGURE 6. If drive pin 92 is not in alignment with a slot in the cartridge hub at the moment the cartridge is fed to the playing position, the pin, which is of crescent shape as shown in FIGURE 7, recedes within collar 84 against the bias of an annular spring 93 upon which the pin is supported. When it is desirable to extend the mechanical driving connection to hub 42 of that particular cartridge, collar 84 rotates until pin 92 comes into alignment with one of the slots 54. At that time, it enters the slot and completes the mechanical connection.

*Bin loading*

In describing the loading of cartridges into the bin, it will be assumed initially that there are no cartridges therein and that platform 64 is in its uppermost position The mounting aperture of the first cartridge is slipped over cap 85 of the spindle assembly and pushed downwardly. If the channelway 53 is aligned with a rib 94 projecting into the bin as shown in FIGURE 7, the cartridge may be inserted further by pushing to overcome springs 65. Obviously, the insertion of the cartridge is blocked unless it is properly oriented with respect to rib 94. In the downward movement of the cartridge, the tapered shoulder of cap 85, immediately above driving collar 84, cams locking element 57 radially outwardly to release the locking engagement of its teeth 61 with teeth 62 of the cartridge. Referring to FIGURE 4, as the cartridge is thus forced down over the spindle assembly, elements 95 and 96 which normally rest in the path of the cartridges yield, being deflected outwardly of the path by the passage of the cartridge itself. Once the cartridge has been inserted sufficiently to place shelves 35 and 36 thereof beneath the level of stop abutments 95 and 96, respectively, the downward pressure on the cartridge may be relaxed because the cartridge will now be retained within the bin. It will be retained at the playing level by the influence of platform 64 which urges the cartridge upwardly against the restraining effect of stop abutments 95 and 96 which overlie stop shoulders 35 and 36 once the cartridge has been inserted to a sufficient depth in the bin. A series of cartridges may be loaded in the same manner, stacked one upon another on the spindle assembly until as many as desired have been stored, up to the capacity of the bin. The cartridges will be accepted in the bin only in that orientation which locates their coupler termination 51 properly to achieve a coupling connection with the companion coupler or extractor when any stored cartridge is to be transcribed in a manner to be described hereinafter.

As indicated in FIGURE 4, there is an additional element 97 which may project into the bin to preclude adding cartridges to the supply. It is of course desirable to preclude adding cartridges during the time a particular cartridge is being transcribed. Lever 97 is controlled by a programming arrangement to be described subsequently and rests under shelf 35 of the cartridge instantaneously in the playing position throughout its play. At other times, however, lever 97 is withdrawn so that the feeding of cartridges may take place both into and out of the bin. For example, it is essential that lever 97 be retracted during a cartridge feed cycle and also during load or reject operations as will be made clear.

*Cartridge sequential feed*

The sequential presentation of cartridges stored within bin 31 to the playing position thereof involves the retraction of stop abutments 95 and 96 to release the cartridge instantaneously in the playing position and, at the same time, the introduction of a third stop abutment 101 into the feed path of the cartridges so that the stack has restriced movement, limited to advancing substantially only the thickness of one cartridge in each feed cycle. The mechanism for carrying out this process is shown in FIGURE 7 and also in the detail views of FIGURES 8 and 9. Initial consideration will be given to the assembly including stop abutments 95 and 101.

A post assembly 102 is secured to the frame or top plate 63 of the transport mechanism as a support for these stop abutments. At its upper surface it carries a T-shaped member 103 which has upstanding flange portions 104 at opposed ends of what is generally considered the horizontal portion of the T. These flanges are apertured to receive a stub shaft 105 upon which are pivotally supported depending flanges of a stop plate 106. Post assembly 102 is mounted adjacent one side of bin 31 and stop abutment 95 constitutes a forwardly extending projection of member 106 which is normally disposed through an opening in the bin into the feed path of cartridges as clearly illustrated in FIGURE 8. An oppositely directed extension of member 103 accommodates an adjusting screw 107 and a spring 111 coiled about pivot shaft 105 urges stop plate 106 in a counterclockwise direction; its normal resting position is determined by the engagement of threaded pin 107 with member 103. The adjustment of pin 107, in controlling the position of stop abutment 105, restricts the upward movement of cartridges 30 under the influence of the upwardly biased platform 64 and in this fashion locates the cartridge engaged by the stop abutment at the precise level for playing.

Figure 9:
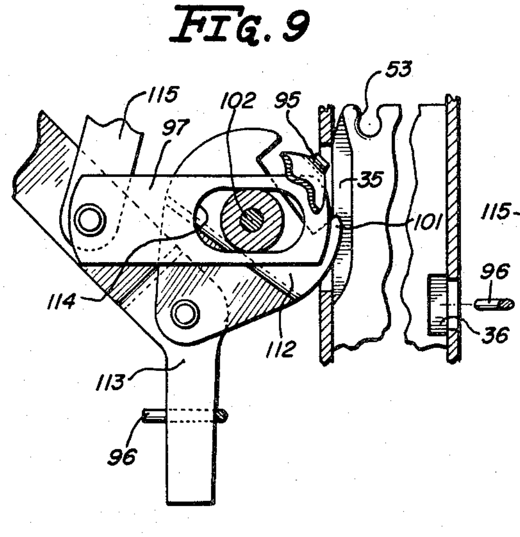
FIGURE 9 is a cross-sectional view taken along lines 9—9 of FIGURE 8.

Stop abutment 101, as shown most clearly in FIGURE 9, comprises one tine of a bifurcated lever 112 which is affixed to a reduced diameter section of post assembly 102 of the lever effects rotation of the post assembly and with it stop abutments 95 and 101. Lever 112 is pivotally connected to a driving lever 113 which may be actuated to oscillate lever 112 and post assembly 102. The bifurcation in lever 112 makes room for the free end of abutment 95 which, in loading of cartridges into the bin, is deflected out of the bin and into the plane of lever 112. Of course, if abutment 95 is short enough not to extend into the plane of lever 112, this bifurcation is not required. The location of lever 112 on post assembly 102 is selected to present stop abutment 101 at a level which is above shelf 35 of the cartridge immediately below the cartridge instantly in the playing position within the bin.

Figure 8:
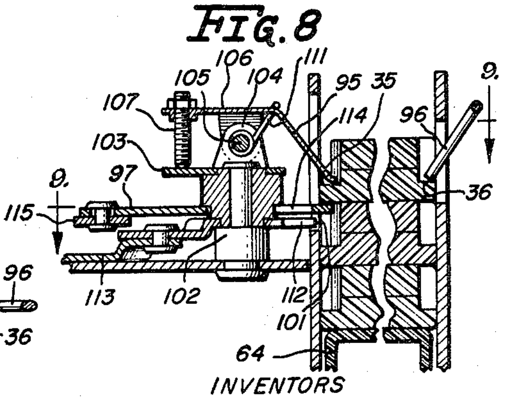
FIGURE 8 is a cross-sectional view taken along lines 8—8 of FIGURE 7.

Intermediate plate 112 and the uppermost portion of post assembly 102 is the slide plate 97 which extends into bin 31 into the feed path of cartridges, as shown in FIGURE 8, at all times except during a cartridge feeding cycle, cartridge reject or during an index or reference condition in which the machine is established when not in use or when the bin is to be loaded. Slide plate 97 has an elongated slot 114 through which post assembly 102 projects. The slot is dimensioned to permit retraction of slide plate 97 from the feed path of cartridges, as shown in FIGURE 9, under the influence of an actuating lever 115 to which plate 97 is pivotally connected and also to permit post assembly 102 to rotate relative to this plate.

Stop abutment 96 is a companion to abutment 95, extending into the opposite wall of bin 31 and engaging shelf 36 of the cartridge to balance the effect of abutment 95. Abutment 96, as represented most clearly in FIGURE 7, is the return bend portion of generally U-shaped wire or rod which, at its opposite end, has a configuration to assist in effecting a mechanical connection to lever 113 which actuates lever 112, this connection permitting lever 113 concurrently to actuate both abutments 95 and 96. The connection is easily effected by forming a J-shaped termination at the actuated end of rod 96. Preferably, the rod passes freely through an elongated guide 116 supported on the deck of the mechanism and a bias spring 117 urges the rod to introduce the end thereof through an aperture of bin 31.

The timed operation of the pair of abutments 95 and 96 in relation to abutment 101 is accomplished by a cam 121 affixed to the free end of a drive shaft 122 for rotation therewith. As shown in FIGURE 7, actuator 113 has a generally L-shaped configuration with a cam following roller 123 rotatably supported at one end and terminating at its opposite end in an extension engaged by rod 96. Actuator 113 is slotted at 124 and a pin 125 secured to frame 63 projects through this slot. A spring 126 is anchored to pin 125 and to a finger 127 of the actuator to urge the actuator generally in the direction of bin 31. Displacement of the pin in that direction, as permitted by slot 124, rotates lever 112 in a counterclockwise direction because of its pivotal engagement with the actuator and concurrently displaces rod 96 to retract its free end from its normal position within the bin.

Actuator 115 of slide plate 97 is pivoted to a pin 128 also extending from frame plate 63. A spring 131 extending between the actuator and a stationary bracket urges the actuator in a counterclockwise direction to introduce the free end of slide plate 97 into the cartridge feed path. Actuator 115 may be rotated in a clockwise direction to retract slide plate 97 from the bin by means of a pair of pins 132 and 133 which depend from the lower surface of cam 121.

At the start of a cartridge change cycle, slide plate 97 and stop abutments 95, 101 and 96 have the relative positions represented in FIGURE 8. As the apparatus enters the cartridge change cycle, cam 121 rotates in a counterclockwise direction and presents pin 132 to lever 115, withdrawing plate 97 from the feed path of the cartridges. Directly thereafter, the low sector of the cam is presented to cam follower 123 which then permits spring 117 to slide actuator 113 in the direction of bin 31. This causes oscillation of post assembly 102, rotating stop abutment 95 out of the feed path of cartridges but introducing stop abutment 101 into that path at a point below the cartridge which has been at the playing level or position in the bin. At the same time, displacement of actuator 113 retracts stop abutment 96 and the complete condition is that represented in FIGURE 9. The uppermost cartridge is now free and is ejected from the playing position while the cartridge immediately thereunder is introduced into the playing position. Continuing rotation of cam 121 restores stop abutments 95 and 96 to their normal positions shown in FIGURE 8 and retracts abutment 101. The pin 132 clears actuator 115, but spring 131 is not permitted to advance slide plate 97 to its normal position extending into the bin because pin 133 is now in engagement with actuator 115. The actuator 115 remains withdrawn after the cartridge feed cycle is completed.

Before leaving this general area of the apparatus, it is appropriate to point out that the actuation of slide plate 97 occurs once in each cycle of cam 121 and the plate remains withdrawn during what may be referred to as the index or reference position and the cartridge change or escape position of the apparatus. It is the index position in which the apparatus stops in response to automatic shut-off to be considered hereinafter and the retraction of slide plate 97 is necessary in order that cartridges may be loaded into the bin as previously explained. It should also be pointed out that the cartridge feed mechanism may also be activated by a manually operated lever. A lever of this type will allow the user of the apparatus to remove cartridges from the well without energization of the programming mechanism and its associated cam 121. This manual cartridge reject lever may also cooperate with the reject switch mentioned further hereinafter. Conventional mechanical interlocks also may be employed to prevent the user from manually ejecting a cartridge from the bin when the apparatus is in a position other than the index position.

*Take-up arrangement*

In order to transcribe a tape established at the playing position within bin 31, a take-up mechanism draws the tape along a path wherein it is presented in magnetic coupling relation to transcribing head 33. This is the requirement for both reproducing a program previously recorded on the tape of the cartridge and for recording a program on a tape fed from the cartridge. For convenience, however, reproducing alone will be considered.

Figure 10:
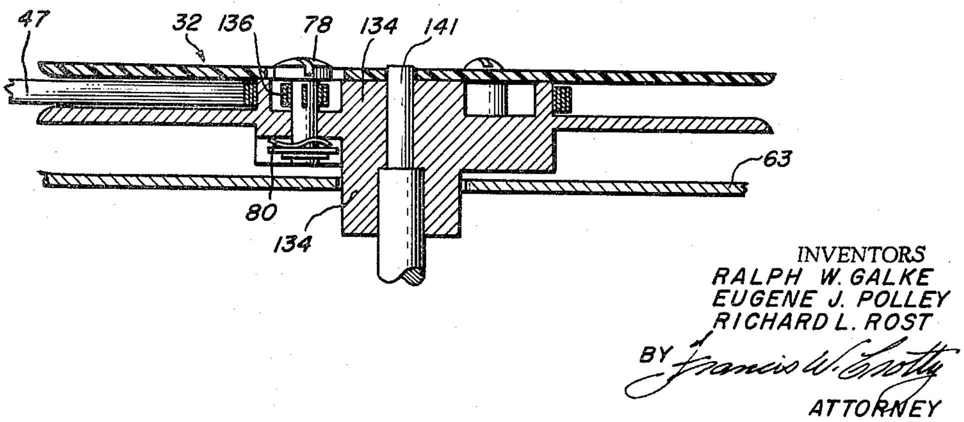
FIGURE 10 is a cross-sectional view taken along lines 10—10 of FIGURE 1.

The take-up mechanism comprises a reel 32 which has a hub 134 having a flat section 135 as shown in FIGURE 1. A flexible leader 136 is affixed to the hub at one end and terminates at its opposite end in a coupling 137 which has been referred to above as an extractor. As shown in FIGURE 10 leader 136 passes through an aperture in the flat portion 135 of hub 134 and is affixed to a pin 78. This pin is positioned within hub 134 and has a slot for accepting an adjusting tool such as a screw driver. The pin is held to hub 134 by way of a frictional washer 80 which permits pin 78 to rotate only when force is applied by the adjusting tool. When pin 78 is rotated, it causes a change in the effective leader length.

Figure 11:
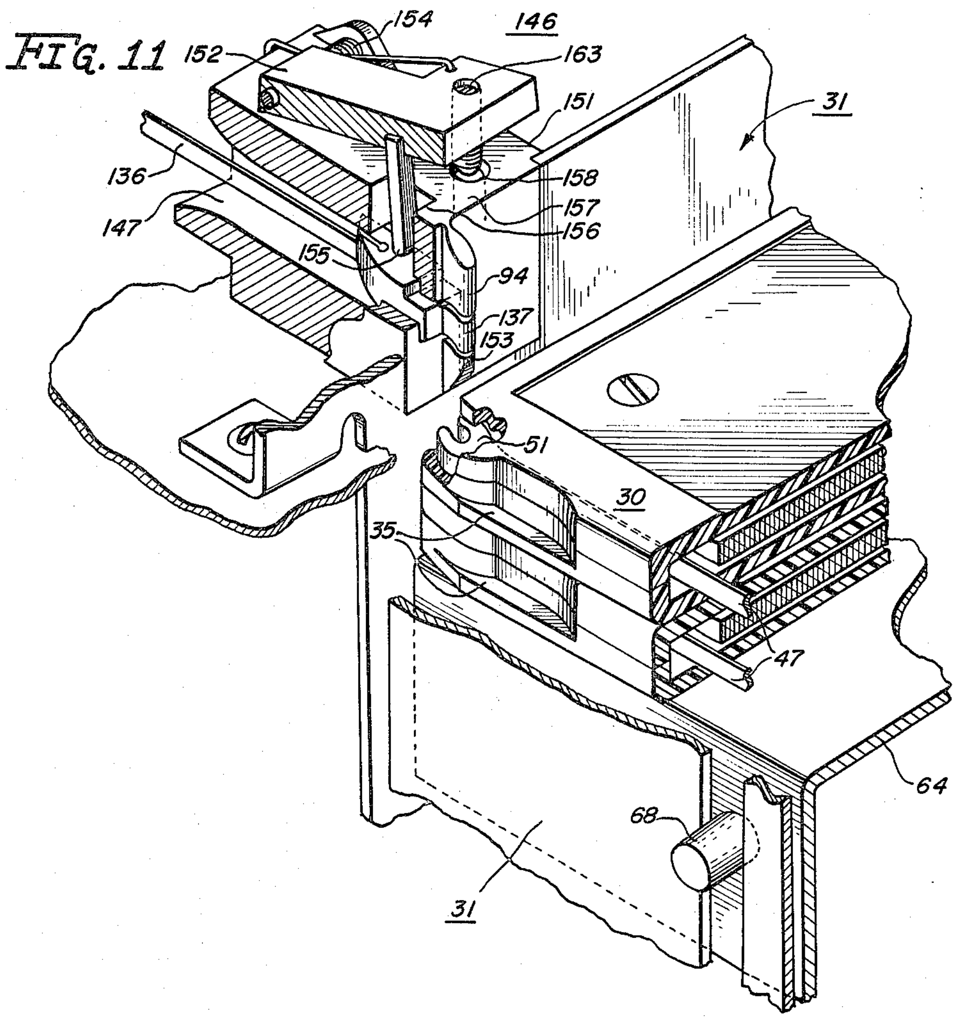
FIGURE 11 is a fragmentary perspective view partially in section of the extractor housing of FIGURE 1 with the extractor positioned therein.

The detail view of FIGURE 11 shows that coupler 137 terminates in a formed section which may slide into the bifurcated coupling termination 51 of the tape carried by any cartridge. The flat section 135 of the take-up reel hub is arranged in conjunction with the length of its leader 136 that, as the leader is coiled about hub 134, coupler 137 is disposed at the flattened section of the hub as shown in FIGURE 1. It has been found that this permits winding convolutions of a program tape thereover in a nearly circularly symmetrical pattern. The slotted pin arrangement 78, 80 previously described is provided both as an adjustment to vary the effective length of the leader when it is installed in the apparatus and compensate for the lengthening of the leader caused by normal use of the apparatus. It allows the user of the reeling device to readily adjust the leader length and insure proper nesting of coupler 137 at the flattened section of hub 134.

Take-up reel 32 is mechanically secured to a drive shaft 141 which projects above deck 63 so that the reel may conveniently be rotated or driven. To achieve a mechanical coupling between a cartridge at the playing position within bin 31 and take-up reel 32 the take-up leader 136 is passed along a path between a driving capstan 142 and a cooperating pressure roller 143, past a tape groove formed at the terminal portion of a magnetic transducer or head 33 mounted on an adjustably positionable bracket 37, and between a tape guide 144 and cooperating pressure pad 145 leading to a housing 146 secured to deck 63 contiguous to that portion of storage bin 31 where coupler 51 of a cartridge in playing position is accessible as shown more clearly in FIGURE 11. The threading of the tape leader along this path may be accomplished before the instrument is released to the customer. In normal use of the instrument thereafter, the take-up leader 136 remains properly disposed along this path relieving the user from the annoyance of threading which is characteristic of many prior tape decks.

Reference is made to FIGURE 11 which shows the structural details of housing 146. It has a channelway 147 cut out of a block 151 with a flared opening facing take-up reel 32 and leading directly to an aperture in the contiguous side wall of storage bin 31. The level of channel 147 corresponds to the cartridge playing level of bin 31. The channel is dimensioned to freely accept extractor 137 which, in its home or rest position, is disposed at the end of channel 147 projecting into bin 31 in vertical alignment with the position assumed by coupler 51 of a cartridge in the bin.

Obviously, in loading cartridges into the bin as indicated above, the proper orientation of the cartridge permits the coupling termination 51 of the cartridge to slide or thread over the complementary termination of extractor 137 as indicated in FIGURE 11 which shows the position of a cartridge having just passed over extractor 137 during loading. The alignment of extractor 137 with the cartridge couplers 51 assures that sequential positioning of the cartridges at the playing level, as described above, introduces the termination of extractor 137 into complete coupling relation with tape termination 51 to establish a firm coupling connection therebetween. To insure proper alignment between elements 137, 51 a rib 153 and a rib 94 are respectively mounted on housing 146 below and above the channel 147. These ribs are positioned to orient the coupler 51 of each cartridge prior to reaching the playing level.

Entrance of extractor 51 into housing 146 and its assuming its rest position shown in FIGURE 11 is relied upon to time part of the programming of the transport operating cycle. To that end a switch operator is incorporated into housing 146, comprising a plate 152 pivotally supported on the top surface of block 151 and urged in a clockwise direction by a spring 154. A tapered finger 155 depends from the undersurface of the plate, passing through a vertical channel 156 into channel 147 to be displaced therefrom as extractor 137 assumes its rest position. A switch operator or pin 157 fits loosely within a second vertically disposed channel 158 of block 151 and rests loosely upon the movable resilient contact of a switch pair 161 positioned on the undersurface of deck 63 directly beneath housing 146 as shown in FIGURE 12. The connection between plate 152 and pin 157 is established through a screw 163 threaded through an opening in the plate into alignment with pin 157. Through this construction one may conveniently adjust the actuation of the switch in response to movement of plate 152.

When extractor 137 is in any position other than that shown in FIGURE 11, plate 152 responds to spring 154 and depresses pin 157 to open switch pair 161. However, as extractor 51 assumes the position shown in FIGURE 11, at the end of a rewind operation plate 152 is displaced in a counterclockwise direction permitting the resilient switch blade of contact pair 161 to move vertically upward and close circuits which advance the programming cycle as explained hereinafter.

*Driving mechanism*

As in any winding and reeling apparatus, the tape may be paid off one reel and taken up by the other through the simple expedient of driving that reel which serves at the moment as the take-up reel. Since the apparatus contemplates the use of one take-up reel 32 in conjunction with any of a number of cartridges stored in bin 31, it is necessary to provide a driving mechanism for selectively rotating reel 32 for the play of the cartridge instantaneously at the playing level in the storage bin. Reel 32 is driven by a motor 164 having a driving shaft 141 to which the reel is mechanically coupled through any suitable means. A similar motor 165 may drive the spindle assembly 43 of the storage bin.

Driving of the tape on its path through the selective energization of motors 164 and 165 is appropriate in the initial portion of the transcribing cycle, for search purposes and also for rewind, but it is desired that a more refinely controlled drive be established for the tape during transcription and that is the function of the capstan 142 and its companion roller 143. Capstan 142 is driven by an induction motor 172 which appears in FIGURE 12. The driving shaft 173 of the motor engages an idler wheel 174 secured to the capstan shaft 175. The end of the shaft removed from the capstan carries a fly wheel 176 for the purpose of minimizing flutter attributable to short term variations in the speed of motor 172.

Driving engagement of the tape with capstan 142 is accomplished by presure roller 143 rotatably supported on a bell crank 177 which is pivoted on a post 178 projecting from deck 63 as shown in FIGURE 1. Since it is desirable to have selective drive of the tape through the agency of capstan 142, this bell crank carries a roller 181 functioning as a follower of cam 121. A spring 182 anchored at one end to the frame of the tape deck and also anchored to the end of the bell crank which carries pressure roller 143 biases bell crank 177 in a clockwise direction. During operating intervals in which the large radius section of cam 121 bears against roller 181, roller 143 is free of the tape and the capstan has no driving effect but when the low radial section of the cam is presented to the roller, as illustrated in FIGURE 1, the bell crank yields to the bias of spring 182 and applies pressure roller 143 against the tape to render capstan 142 effective to feed the tape from a cartridge at the playing position in bin 31 to take-up reel 32.

It is most desirable that there be efficient magnetic coupling between the tape and transcribing head 33 and this results from having a well-defined path of travel of the tape past the head. The path is defined by the capstan and pressure roller on one side of the transcribing head and guide 144 and pressure pad 145 at the opposite side. Since coupling of the head to the tape is of importance essentially only during intervals in which the tape is subject to the driving effect of capstan 142, it is arranged that pressure pad 145 assumes its operating position only when pressure roller 143 is effective.

Pad 145 is supported on a bell crank 183 pivoted to a post 184 supported on the deck and urged by a spring 185 toward guide 144. A pin 186 on the bell crank lays over bell crank 177. Accordingly, when bell crank 177 is displaced by cam 121 to withdraw pressure roller 143, lever 177 engages pin 186 to concurrently relieve pressure pad 145 by displacing it from the tape path.

*Sensing system*

Figure 13:
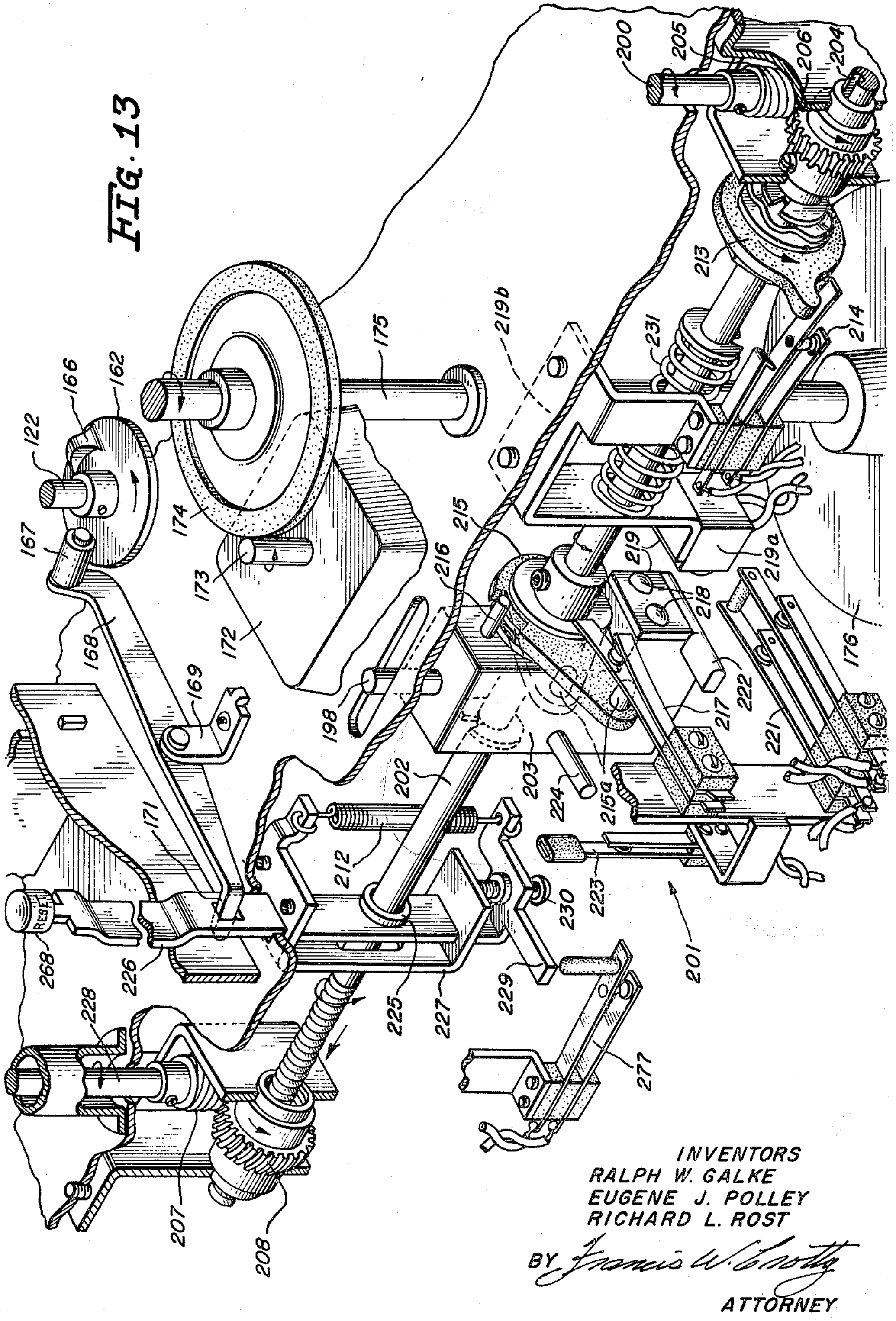
FIGURE 13 is a fragmentary perspective view of the reset and sensing mechanism of FIGURE 12.

Inasmuch as the tape deck is a fully automatic instrument having complex functions to be performed in proper relation to one another, it is necessary to provide a programming arrangement to time the sequence of functions to be accomplished in any operating cycle. For that reason the instrument includes a sensing mechanism that is both reliable and accurate in its operation. It is designated 201 and is illustrated in FIGURES 12 and 13, inclusive. The sensing system employs the principle that when a tape has been completely played, take-up reel 32 must have executed the same number of revolutions as the hub of the cartridge from which the tape has been paid out, irrespective of the length of the tape. The mechanism to be described has the attractive attribute that its function is dependent on the relative turns or revolutions of the reels and is independent of the thickness of the tape.

The sensing mechanism comprises a movable, partially threaded shaft 202 and a carriage 203 coupled thereto. A plurality of contact pairs operate in accordance with the position of this carriage which is controlled by both the cartridge from which the tape issues and by the take-up reel. The carriage is loosely coupled to shaft 202 and is prevented from rotating therewith by a pin and slot arrangement 198.

The partially threaded shaft is rotatably driven at one end by a pair of gears 205 and 206 and longitudinally driven at the other end by a pair of gears 207 and 208. Gear 205 is coupled to take-up motor 164 by way of drive shaft 209 while gear 207 is coupled to shaft 228 driven by cartridge motor 165. The internal portion of gear 206 contains a drive-key, shown in FIGURE 12, which engages a keyway 204 cut in one end of shaft 202 while the internal portion of gear 208 is threaded and engages with threads on shaft 202. The drive-key and associated keyway provide a lost motion or slidable coupling between gear 206 and shaft 202. The thread of shaft 202 and the internal thread of gear 208 are of the same pitch but of different diameter. A spring 212 coupled between the mounting structure of the apparatus and the shaft biases the threaded end of the shaft into engagement with the threaded aperture of gear 208. Rotation of the shaft by gears 205 and 206 causes the shaft to move into and out of the threaded aperture of gear 208. On the other hand rotation of gear 208 does not bring about rotation of shaft 202 but does cause the shaft to move longitudinally. Gear 208 is limited to rotational movement only, thus the shaft must move in a longitudinal direction.

Certain contact pairs which provide automatic control are actuated by various levers frictionally affixed to shaft 202. For example, a lever 213 is affixed to the shaft in such a manner so that it rotates therewith unless arrested by an abutment in its path. When the lever is prevented from rotating, shaft 202 continues to rotate without incident. When the shaft is rotating in a counterclockwise direction as shown, which corresponds to the play mode, lever 213 rotates until its movement is stopped by the top or upper leaf of switch pair 214 thus closing, at least momentarily, the normally open switch pair. On the other hand when the shaft is rotating in the opposite direction, lever 213 rotates approximately one full revolution and is stopped by the bottom surface of the upper leaf of switch pair 214.

A switch-operating lever 215 is also mounted on shaft 202 but is only allowed a movement of a few degrees. A stop pin 216 cooperates with a cut away section of the lever to determine the extreme upper and lower positions which the lever may assume as determined by the direction of rotation of shaft 222. As the dotted lines indicate in FIGURE 13, a switch actuator 215*a* carried near the free end of lever 215 is at the level required to actuate contact pair 217 only when lever 215 is in its uppermost position.

A set of shorted contact terminals 218 is carried by carriage 203 to cooperate with a mating set of contacts (not shown) carried on the contiguous face of an insulating block 219*a* to form an effective switch 219. Block 219*a* is supported on a frame 219*b* secured to the base of the instrument. With this arrangement no conductors are coupled to the carriage and no conductor wear is experienced due to movement of the carriage. A double contact pair 221 is supported from the structure of the apparatus to be actuated by a finger 222 extending from carriage 203. The previously mentioned contact pairs are the only control switches activated during the normal programming cycle of the apparatus.

The operation of the sensing system is best described with reference to FIGURES 12 and 13. In initiating the normal cycle of operation, the instrument is turned on by actuation of a stop or play button 232. Motor 164 is energized and drives take-up reel 32. Motor 165 is de-energized and the cartridge located at the play position within bin 31 constitutes a load on the take-up system. The hubs of take-up reel 32 and the tape supply reel cartridge 30 have the same diameter, but reel 32 initially rotates rapidly compared with the reel of cartridge 30 which at this juncture bears all of the program tape and therefore has a much larger effective diameter. As a consequence, gear 205 is driven much faster than gear 207; correspondingly, gear 206 is driven much faster than gear 208. This causes shaft 202 to be effectively threaded into the threaded aperture of gear 208 and to move in the direction indicated by the arrow. Gear 208 rotates concurrently in a direction which tends to move the shaft in a direction opposite to that shown by the arrow but at this time the relative speeds of rotation of gears 206 and 208 result in movement of the shaft in the direction shown.

After an initial winding step in which extractor 51 is drawn from housing 146 past capstan 142 and its associated roller 143, shaft 202 will have made approximately one revolution thereby allowing actuator 213 to at least momentarily close contact set 214. This is shown in FIGURE 13. As will be explained subsequently, lever 213 always starts its path of travel from a reference position.

Closure of switch pair 214 results in the actuation of cam 121 through which capstan 142 is brought into driving engagement with the program tape to control the feed of tape from cartridge 30 to take-up reel 32. This is known as the play mode whereas the first described condition may be referred to as the start mode. During the play mode, even though the tape is controlled by capstan 142, motor 164 remains sufficiently energized to drive reel 32 and accept the tape as it is fed from the capstan.

While take-up reel 32 initially rotates rapidly relative to the hub of cartridge 30 and shaft 228 their speed differential decreases during the play of the cartridge tape because the effective diameter of the hub of the take-up reel increases with each convolution of the tape wound thereon. The effect of gear 208, rotating in a direction tending to move shaft 202 in a direction opposite that shown by the arrow, increases throughout the first part of the play mode and when the effective diameters of the take-up reel and the cartridge are substantially the same, there is no longitudinal motion of shaft 202. At this point, shaft 202 is effectively being threaded into gear 208 at the same speed at which gear 208 is tending to move it in its opposite direction. After this point, however, the take-up reel has the larger effective diameter and gear 208 commences to rotate more rapidly than gear 206, thereby causing the shaft to move in a direction opposite that shown by the arrow in FIGURE 13. When carriage 203 returns to the position it held prior to the depressing of the play button, shorting contacts 218 close switch 219. Closing of this switch effects further incremental displacement of cam 121, raising roller 143 to disable the capstan drive, raising pressure pad 145 and initiating the rewind portion of the cycle by energizing motor 165 and de-energizing or, if desired, effecting a braking action of motor 164.

Because the reel shafts are now moving in a direction opposite to that in which they moved during the play position, shaft 202 once again moves outward in the direction of the arrow. As this cycle begins, shaft 202 rotates in a clockwise direction and causes actuator 215 to move to its upper position as shown by the dashed lines in FIGURE 13. The carriage again moves out in the direction of the arrow until the effective diameters of the reels are the same. The carriage then proceeds to move back towards its reference or start position. Just prior to reaching this position, lever 215 closes normally open contact pair 217 and causes a further incremental displacement of cam 121 to establish a slow rewind mode of operation. In other words, the rewind is carried out for most of the tape at very high speed but when contact pair 217 is closed, the rewind continues at a reduced speed to prevent coupler 137 and extractor 51 from damaging the cartridge and housing 146 as they return to their starting point.

As explained above homing of extractor 137 within housing 146 permits switch operator 157 to close contact pair 161 and rotate cam 121 to execute the cartridge change cycle. After the last cartridge in the bin has been played and rewound, the cartridge change cycle is interrupted in the index condition as an automatic shut-off is accomplished in a manner to be described subsequently.

*Overall operation*

To operate the tape deck, one or more cartridges are loaded into bin 31. Their loading orients each cartridge so that the one which is instantaneously at the playing position is in mechanical coupling engagement with the take-up arrangement as required for transcription. To start a transcription, the on-off switch 233 is adjusted to its "on" position and play button 232 is depressed. This places the instrument in its start mode in which take-up reel 32 is driven to present the program tape to the transcribing head 33. After the coupling elements 137 and 51 have cleared capstan 142 and its pressure roller 143, the drive is transferred through the influence of programming cam 121 to the capstan 142. At this time the instrument is in its play mode as shown in FIGURE 1 and indicated by arrow 234 positioned adjacent cam 121 and the tape is transcribed. When the tape has been fully transcribed, programming cam 121 in conjunction with associated electrical circuitry explained more fully hereinafter places the instrument in its rewind condition and the tape is rewound into the cartridge at a very fast rate. Near the completion of the rewind function, cam

121 and its associated switch circuitry initiate a slow rewind for the final part of that function. When this function has been completed, cam 121 rotates to actuate the cartridge feed mechanism 38 and to re-establish the start conditions so that the next cartridge contained in the bin may be played.

This process is repeated until every cartridge contained in bin 31 has been transcribed. As each cartridge is moved into the playing position within the bin, it is automatically coupled to the take-up mechanism because of the alignment of its coupling termination 51 with extractor 137 when the latter is in its home position within housing 146 where it is returned after the completion of each transcription. After the play of the final cartridge, the machine enters its automatic shut-off condition.

*Automatic shut-off*

While it is desirable automatically to shut off the transport mechanism after the final cartridge stored in bin 31 has been played in order to describe the shut-off mechanism, it is necessary first to understand a lock up linkage associated with play button 232.

Play button 232 is a push button actuator for a switch 235 mounted to the frame of the deck as shown in FIGURE 12. The push button is supported for vertical displacement and is urged upwardly by a spring 236. A locking plate 237, which is slideably supported on the top surface of deck 63 as seen in FIGURE 1, is urged toward switch actuator 232 by a spring 238. As the play button 232 is depressed, lock plate 237 slides over a shoulder portion thereof and locks the switch in its operated position as indicated in FIGURE 12. To accomplish automatic shut-off, it is necessary to slide plate 237 to the left, as viewed in FIGURES 1 and 12, which permits spring 236 to return play button 232 to its "off" position. The mechanism for achieving this shut-off will now be considered.

A bell crank 241 is pivotally mounted on the top surface of deck 63 by a pin 242 and has a cam following termination which may be displaced by a pin 249 positioned on programming cam 121. At its opposite extremity, the lever has a hook shaped termination 243 and the lever is normally biased in a counterclockwise direction by a spring 244 but its displacement in that direction is limited by a stop 245.

Cooperating with lever 241 is a pivoted lever 75 supported on a pivot pin 246 and biased in the direction of bin 31 by a spring 247. Its movement in that direction is limited by engagement of one end of lever 75 with the side of the bin. Intermediate this termination of lever 75 and pivot 246 is a cam surface 248 disposed in the path of pin 68 which extends from platform 64 within the bin. At its opposite end, lever 75 carries an upstanding pin 251 which may be engaged by the hook termination 243 of lever 241 although, under normal circumstances, their relative position is such that they do not engage one another.

So long as cartridges are stored in bin 31 to be played by the machine, the operating cycle proceeds as described above and in such cycle the cartridge feed mechanism 38 is actuated to advance another cartridge into the playing position. In the cartridge feed cycle immediately succeeding the play of the lowermost cartridge in the bin, pin 68 abuts cam surface 248 and rotates lever 75 against the influence of spring 247, moving the lever in a counterclockwise direction. Immediately thereafter, the pin 249 of programming cam 121 engages and displaces lever 241 in a clockwise direction about its pin 242. This displacement of lever 241 occurs after each cartridge feed cycle and displaces hook 243 in a direction to engage pin 251. Their engagement is only possible, however, after lever 75 has been actuated by pin 68, moving lever 75 to the dotted line position shown in FIGURE 1 and introducing its pin 251 into the path of movement of the hook 243. Engagement of this hook with pin 251 permits lever 241 to displace slide plate 237 to the left as viewed in FIGURE 1, releasing switch button 232 so that its spring 236 may return the button to its "off" position and shut off the machine at least so far as its programming circuitry is concerned.

*Search*

The machine, by preference, employs a tap adapted for a relatively slow transcription speed. For example, it has been proposed that the tape be driven at the speed of 1⅞ i.p.s. as distinguished from the 3¾ o.p.s. speed of other known devices. The advantages of the slower tape speed are obvious in reducing the size of the cartridge for a given playing time. Where the machine does employ a slow transport speed, however, the user benefits from a search feature which permits the tape to be moved rapidly in either direction to locate some particular part of the program material contained thereon. Such a feature has been provided in the apparatus represented in the drawings.

The search control 252 is shown in FIGURES 1 and 7. It is a generally heart-shaped cam 264 mounted for rotation on a post extending from deck 63. A cam following roller 253 is presented to this cam and is carried on a slide plate 254. The free end of the slide plate supports a pin 255 which couples the slide plate to bell crank 177. When slide plate 254 is moved in the direction of cam 121, bell crank 177 is rotated against the action of spring 182. This removes both pressure roller 143 and pressure pad 145 from their operative positions. This is desirable because the search takes place at a speed much faster than that attained through capstan 142 and therefore the capstan drive is disabled during searching. Intermediate its ends, slide plate 254 has a slot 256 which may receive a pin 257 depending downwardly from a lever 258 pivoted to a post 261 on the deck. The opposite end of lever 258 overlies an enlarged portion of the shaft which terminates in play button 232 to permit pin 257 to lock with slot 256 in response to the releasing of play button 232 when the search control is rotated. A spring 262 encloses a depending projection 263 of lever 258 and urges the lever in a counterclockwise direction about its pivot. The slot and pin arrangement is shown more clearly in FIGURE 7.

It is appropriate to release play button 232 during any operating interval in which the search control is to be effective and accordingly cam 264 has a cut-away cam section 265 against which rides a cam following roller 266 which projects upwardly from slide plate 237.

The normal position of search control 252 is that represented in FIGURE 1. Roller 266 here engages the central portion of cam track 265 and interferes in no way with the described operation of play button 232 in turning the transport mechanism on and off. After the mechanism has been turned on by depressing play button 232, the search control may take over by rotating the control clockwise or counterclockwise depending upon the desire to search in a forward or backward direction on the tape. Displacement of the search control from the position shown results in cam section 265 displacing slide plate 237 by its influence upon cam following roller 266. This releases the locking plate from push button 232 and causes the push button to return to its off position.

Concurrently, a high portion of cam 264 is presented to cam follower 253 to displace slide bar 254 in the direction of program cam 121. This causes pressure roller 143 and pressure pad 145 to be moved away from the tape in order that the tape may pass freely along its path without any interference from the capstan or the guide 142, 144. The pressure roller 143 and pressure pad 145 are retained in this position because the movement of the slide bar which displaced these elements resulted in pin 257 dropping into locking engagement with slot 256 of the slide bar, being helped in this movement by the effect of the spring 262 which pivots lever 258 about its pivot 261.

Moreover, at the same time play button 232 is released and pressure roller 143 is removed from its operative position, a high speed energizing circuit is completed selectively to reel motors 164 or 165 depending upon the direction of search that is desired. After the tape has been wound to present a preselected portion to the transcribing head 33, search control 252 is returned to its normal position represented in FIGURE 1. The machine is now in a quiescent condition and the tape may be transcribed by depressing play button 232. The button engages lever 258 and rotates it in a clockwise direction to release the locking engagement of pin 257 and slot 256. Also, slide plate 237 returns to its locking engagement to hold the play button in its "on" position and transcription then proceeds in the normal way.

*Reject*

During the play of any given tape, the user may elect to discontinue the transcription and reject that particular cartridge from the playing position within bin 31. This is accomplished by a reject button 267 which appears in FIGURE 1. When the reject button is depressed, a circuit is completed which is essentially the same as that which initiates rewind after a tape has been completely transcribed. It puts the apparatus into rewind in which the tape is rewound upon its cartridge and then ejected in the usual manner of the cartridge change cycle.

*Reset mechanism*

Provision is made both to interrupt the normal play cycle of the instrument and to permit its being properly reset in the event that a tape should break during transcription. If the tape should break while the take-up reel 32 is being driven and the sensing mechanism is in that part of its cycle where it is moving toward the cartridge reel, shaft 202 and carriage 203 will continue their movement in that direction but at a much faster speed. On the other hand if the shaft 202 and the carriage 203 are returning to their reference position when the tape breaks, they will reverse their directions and rapidly move toward the cartridge reel motor. After the carriage and shaft have traveled in a direction toward the cartridge reel motor, an amount which exceeds their excursion in a normal play mode, an actuator 224 coupled to carriage 203 opens a normally closed contact pair 223 which is supported from the structure of the apparatus. This deenergizes the tape transport mechanism and interrupts its normal cycle of operation. After the tape has been repaired or spliced, it is necessary to reset the carriage and associated shaft to a reference position before starting the instrument anew on its operating cycle. This is the function of the reset mechanism.

As shown in FIGURE 13, there is a reset button 268 accessible on the top of deck 232 in the region between the storage bin opening and the search control 252. It is in effect a switch operator which controls the reset circuitry by actuation of a switch 277 which is also supported from the structure of the apparatus. The spring 212 which holds the threaded portion of shaft 202 into engagement with the threaded aperture of gear 208 also holds the reset button in its unactuated position.

The maintaining of proper engagement between the threaded portions of the sensing mechanism tends to cause shaft 202 to flex due to the biasing action of spring 212. The flexing of shaft 202 is prevented by a bearing mount 225 captivated by a lever 226 which is connected to reset button 268. Spring 212 is connected between a structural support member on the deck and the terminal portion of the L-shaped lever 226. A set screw 230 is threaded into this terminal portion of lever 226 and abuts against an L-shaped member 227. To remove any bending of shaft 202 which may be present, screw 230 is rotated thus changing the position of bearing mount 225.

This change in position is accomplished without a corresponding change in the biasing force applied to shaft 202 by spring 212. Binding or flexing of the shaft caused by application of force from spring 212 is prevented by bearing surface 225. A shoe 229 also extends from the terminal portion of lever 226 and is positioned opposite normally opened contacts 227. These contacts are positioned so that actuation of reset button 268, which causes lever 226 to move downward, may close them.

Essential to the reset operation is a coil spring 231 which is positioned about shaft 202 and has one end coupled to the shaft for movement therewith while the remaining end abuts against a depending structural member 219*b* having a clearance hole for the shaft to pass therethrough. The spring is compressed during normal movement of the sensing mechanism and tends to bias shaft 202 and carriage 203 to their reference position shown in FIGURES 12 and 13.

To accomplish reset, button 268 must be depressed and held actuated. In assuming its depressed position, lever 226 moves shaft 202 downward to disengage the threaded portion of the shaft from the internal threads of gear 208. The disengagement of these elements allows coil spring 231 to move the shaft and carriage assembly axially to their reference positions. The downward movement of lever 226 also causes finger 229 to close contacts 277. The closing of contacts 277 as well as the closing of switch 219 by the return of carriage 203 to its reference position causes program cam 121 and its associated switch to travel to the end of the program cycle. In returning to the end of the program cycle, the cam controlled circuitry energizes the cartridge motor to return the repaired tape to the cartridge. The reset button must remain depressed until all of the repaired tape is returned to its cartridge. The electrical circuits involved will be explained more fully hereinafter. After the reset cycle is complete, the machine ejects the cartridge containing the repaired tape and is ready to execute its next normal cycle of operation when the play button is depressed.

To insure that the sensing mechanism is in its reference position prior to the initial transcribing of tape by the apparatus an automatic reset operation is performed. A circular plate 162 is concentrically mounted with cam 121 on shaft 122 for rotation therewith. A ramp cam 166 extends upwardly from the circular plate and engages a roller 167 pivotally mounted to one end of a bell crank 168. The remaining end of the bell crank has a finger 171 which passes through an opening in lever 226. As cam 166 engages with roller 167, it forces lever 168 to pivot about post and pin unit 169 which moves finger 171 downward. Finger 171 causes lever 226 to move downward thereby disengaging the shaft and gear 208 and allowing spring 231 to return the shaft and carriage to their reference position if they are not situated there. The ramp surface is positioned on plate 162 so as to reset the sensing mechanism each time the programming cam passes through the index position. As will be explained more fully hereinafter, when the machine is not energized it will normally reside in the index position. Thus, accidental rotation of spindle 43 and/or of the take-up reel 32 will not cause a corresponding rotation of shaft 202 thereby preventing misalignment of the sensing mechanism.

*Control circuitry*

Figure 14:
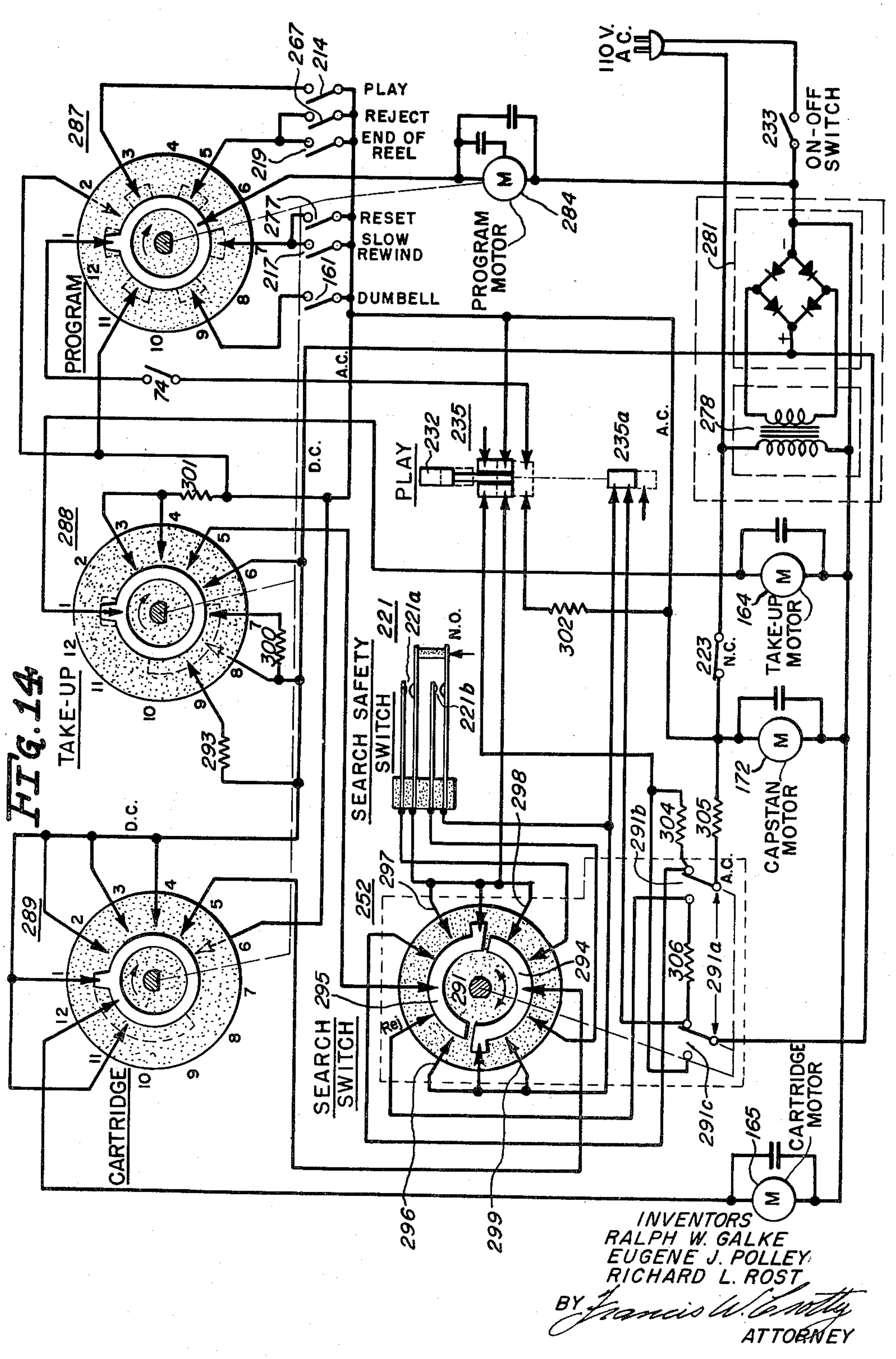
FIGURE 14 is a schematic diagram of the circuitry of the instrument except for the signal reproducing system which is connected to the transcribing head.

The transport device operates from a conventional 110 volt alternating current (A.C.) source as shown in FIGURE 14. The switch 233 is connected in an A.C. power line circuit and serves as the main power switch. The low voltage output of a voltage reducing transformer 278 is connected to a rectifying device 281 which provides a source of direct current (D.C.) voltage.

Capstan motor 172 is electrically connected to power switch 233 by way of normally closed contact pair 223 associated with the sensing device and reset mechanism for use in conjunction with the broken-tape safety feature. Thus, the operation of the capstan motor is directly controlled by switch 233.

As previously explained, cam 121 controls a majority of the levers and linkages which in turn control the operation of the device. A driving mechanism is needed to both position the cam and simultaneously activate electrical circuitry which must cooperate with the cam to electrically control the tape transport operation. As shown in FIGURE 7, cam 121 is fastened to one end of a drive shaft 122 which is driven through a reduction gear assembly 283 mounted to the underside of deck 63. The other end of drive shaft 122 passes through a multi-section wafer switch 282 which is firmly fastened to the underside of gear box 283. A program motor 284 is mounted to gear box 283 and its drive shaft 285 is coupled to the gear box to rotate shaft 122.

The program switch 282 is constructed of three wafers respectively designated as the program motor wafer 287, the take-up motor wafer 288 and the cartridge motor wafer 289. Wafer 287 controls the operation of program switch motor 284 while wafers 288 and 289 respectively control the take-up and cartridge motors. Each wafer is conventional in construction having a fixed outer segment carrying contact points and a movable inner segment, usually referred to as a rotor, which may carry one or more circuit connectors. These rotors have electrical conductors on their top or front and bottom or back surfaces and are mounted upon drive shaft 122. The top and bottom conductors on each rotor are electrically coupled together. These rotors simultaneously change positions along with cam 121 as shaft 122 rotates.

Each wafer has 12 discrete electrical positions with positions 1, 3, 5, 7, 9, and 11 respectively designated as the index, start, play, rewind, slow rewind and escape positions. In contrast, positions 2, 4, 6, 8, 10, and 12 are required transition positions necessary to bring about coordination of the mechanical and electrical functions of the programming position. This will be explained further hereinafter. The operation of the program system may best be explained with reference to FIGURE 14. It is assumed that the cartridges are in position within the bin and on-off switch 233 is in the closed position. The rotors of the three wafers are in their index positions as shown. With the cartridges in the bin, lock-out contact pair 74 positioned along side the bin is closed. Depressing the play button 232 closes the contacts to switch 235 and energizes the program motor with A.C. potential derived from the input by way of the 1st position of wafer 287. The energized program motor moves the rotors of all the wafers to position 2. In this position the top circuit of wafer switch 287 is open but the back contact section of the rotor continues the A.C. circuit of the program motor through the back contact point in position 2. The circuit to the program motor is carried on past position 2 and the motor remains energized until all of the rotors reach the start position 3. The energizing circuit for the program motor is now open and the program motor stops rotating.

In positions 1 and 2 the take-up wafer applies a full D.C. voltage to the take-up motor through the back contact of the rotor of wafer 288 by way of contact point 8. The cartridge wafer 289 also applies D.C. voltage by way of its contacts 1 and 2 to cartridge motor 165. The application of D.C. is necessary to prevent spindle 43 from rotating so that the cartridges may move freely within the bin and also to prevent the take-up reel from rotating so that the extractor resides in its proper position within housing 146. In position 3 a low A.C. voltage is applied to take-up motor 164 by way of a dropping resistor 301, while cartridge motor 165 continues to have the D.C. voltage applied to it. Accordingly the take-up reel withdraws tape from the cartridge very slowly due to the braking effect on the cartridge reel caused by the D.C. voltage applied to the cartridge motor.

After the shaft of the sensing mechanism has made almost one complete revolution in a counterclockwise direction, actuator 213 closes contact pair 214. The actuator will always start its path of travel from its furthest possible clockwise position having resided there at the completion of the entire rewind operation. This single revolution of shaft 202 corresponds to a predetermined length of tape which has been wound on the take-up reel. The closing of contact pair 214 energizes program motor 284 through contact 3 of the top of contact rotor of wafer 287 and contact 2 through the bottom contact set again continues this circuit until position 5, the play position, is reached.

In positions 4 and 5 take-up motor 164 continues to be energized through take-up wafer 288. However, in position 5, the application of low A.C. voltage to the take-up motor now reaches the take-up motor by way of the search control 291 and a dropping resistor 302. This will be explained more fully hereinafter. In position 4 cartridge motor 165 still has the same braking D.C. voltage; however, in position 5 the circuit is open and no other circuit is completed to the cartridge motor. As shaft 122 steps the rotors to the 4th and 5th positions, cam 121 moves pressure roller 143 and pressure pad 145 to the position shown in FIGURE 1. In this position, capstan 142 extracts the tape from the cartridge at the playing level and the low A.C. voltage applied to the take-up motor is sufficient to rotate the take-up reel to receive the tape as it leaves the capstan drive.

When the entire tape has been played, the sensing system closes switch 219 which completes an A.C. circuit through the top contact 5 of wafer 287 to the program motor and the bottom contact 2 of the back rotor of wafer 287 continues the circuit to step the rotors to position 7, the rewind position, where the circuit is open at contact pairs 217 and 277.

In the 6th position of wafer switch 288, a full D.C. voltage is applied to the take-up reel motor while in the 7th position a reduced D.C. voltage is applied by way of a resistor 300. In the 6th position full A.C. is applied to the cartridge motor through the back rotor contact of wafer 289. When the rotor is in position 7 the back conductor segment of the rotor continues to carry the circuit through contact 6 to the cartridge motor. In moving the rotors from positions 5 to 7, shaft 122 concurrently rotates cam 121 to move pressure element 143 and pressure pad 145 away from capstan 142 and guide post 144 respectively. This allows the cartridge motor to wind the tape back into the cartridge at a fast rate without difficultly. This rewind operation causes lever 215 which is frictionally coupled to shaft 202 as previously explained to move to its uppermost position so it may readily actuate switch pair 217 of the sensing mechanism when the fast rewind operation is to be terminated.

The high speed rewind operation continues until all but a predetermined amount of tape has been returned to the cartridge. At this point contact pair 217 of sensing mechanism 201 is closed by actuator 215 and completes a circuit to program motor 284 through contact 7 of the program wafer 287. The carry-over circuit on the back side of the rotor of wafer 287 continues the circuit through position 8 until the rotors reach position 9, the slow rewind position, where the program motor stops because contact pair 161 is open.

In position 8 take-up wafer 288 applies a D.C. voltage from rectifier 281 to take-up motor 164 by way of back contact 8 and the back conductor segment of the rotor to momentarily stop the rotation of take-up reel and halt the rewind operation to prevent damage to the coupler and extractor. In position 9 a lower D.C. voltage is applied to take-up motor 164 through the top conductor segment of the rotor and contact 9 of wafer 288 through a dropping resistor 293. The back conductor segment of the rotor of cartridge wafer 289 continues to supply A.C. voltage to the cartridge motor in positions 8 and 9. Thus, the rewind operation resumes but at a much slower speed because of the loading effect of take-up motor 164.

When all of the tape is returned to the cartridge, extractor 137 returns to its home position in housing 146 and switch pair 161 now closes energizing the program motor. The front and back conductor segments of the rotor of wafer 287 cooperate to continue energization of the program motor until the rotors have moved through positions 10, 11, and 12 to position 1.

In positions 10, 11 and 12 D.C. voltage is applied to take-up motor 164 through wafer 288 by way of its back conductor segment of the rotor to prevent movement of the take-up motor. Cartridge wafer 289 applies an A.C. voltage to the cartridge motor through its back conductor segment and back contact at position 6 while the rotor is in position 10, applies a D.C. voltage to the cartridge motor when the rotor is in position 11 by way of the front conductor segment of the rotor, and makes no circuit to the cartridge motor in position 12.

In passing from position 9 to position 1, cam 121 activates feed mechanism 38 which moves a new cartridge to the playing level if one remains to be played, and the entire program cycle repeats. However, if no cartridge remains to be played, play button 232 is released by the automatic shut-off feature and the program motor stops in index position 1. The lock-out switch contact pair 74 and the play switch contacts 235 are in series and both must be closed before the cycle can be again started. If the play button were not released, i.e. the contacts of switch 235 were not opened, the program motor would start as soon as platform 264 was depressed when new cartridges were being placed into the bin.

It is sometimes desirable to interrupt the normal playing cycle of the tape and continue onto the next cartridge or to turn the machine off before the last cartridge has been completely played. The reject button 267 is provided for this purpose and has its contact pair electrically connected in parallel with switch 219 of sensing device 201. As previously explained, the closing of switch 219 initiates a high speed rewind operation. This same automatic rewind condition may be brought about at the user's election by depressing reject button 267 when the machine is in the play mode of operation. In all other modes of operation, reject control 267 is ineffective.

Reset button 268 is provided to reset or realign sensing mechanism 201 in the event that the tape breaks during tape transportation. Should the tape break, the normally closed contact pair 223 will be opened as previously explained. Contacts 223 are in series with power switch 233 and when opened remove all the power from most of the transport mechanism. However, transformer 278 and rectifier 281 still remain energized. Before the tape can be repaired, the pressure element 143 and pad 145 must be raised by the user with the aid of search control 252. After the tape is repaired, reset switch 268 must be depressed to reset sensing mechanism 201. When depressed the reset button closes switch pair 277. As shaft 202 is returned under the influence of spring 231 to the reference position, switch 219 which normally activates the programming mechanism is closed and the rotors are indexed to the 1st position. However, because actuator 215 which is associated with the slow rewind mode may not be in position to actuate switch pair 217 the program cam and rotors may stop in position 7. To prevent this, switch pair 277 is connected in parallel with contact pair 217 and is actuated when the reset button is depressed. To insure successful realignment of the sensing mechanism and return of the repaired tape to the cartridge, button 268 must remain depressed until the cartridge motor stops rotating. This will occur only when switch contact pair 161 is open by the returning of the extractor 137 to the housing 146.

The search control 252 permits moving the tape at relatively high speeds in either direction to search out a desired portion of the recorded program. The circuitry of search control 252 includes the 12-contact wafer switch 291 as well as the associated toggle arrangement 291*a*. The rotor of switch 291 is made up of two asymmetrical contact strips 294 and 295 which respectively apply appropriate voltages to the cartridge and take-up motors by way of switch 221 only during intervals in which the rotors of take-up and cartridge wafers 288 and 289 are in the 5th position. This is the only position of the program switch which allows the circuitry of search switch 291 to energize take-up and cartridge motors 164 and 165.

Search control 252 may be moved to either a forward or a reverse search position. In either case, play switch 235 is opened by the release of button 232 as previously described. The forward search position corresponds to a displacement of the rotor of switch 291 in a counterclockwise direction as viewed in FIGURE 14 and the reverse search corresponds to clockwise displacement of that rotor. The rotor position for the forward search causes circuit connections to be completed at both contacts designated "FWD" and the reverse search position completes a circuit involving both contacts designated "REV." It is apparent from inspection of FIGURE 14 that displacement of the search switch to either of these two search positions causes a temporary closure of the rotor with intermediate contacts 296–299 inclusive.

Associated with search switch 291 is a toggle arrangement 291*a* comprising contact sets 291*b* and 291*c*. This toggle arrangement cooperates with the search switch and is switched to the appropriate position by mechanical linkage (not shown) thereby applying a D.C. braking voltage to the reel which is supplying tape in the search operation. For example, in the full clockwise position which corresponds to a search in the reverse direction, i.e. opposite the direction of normal tape travel during the play mode, the return of the rotary control 291 to its center position brings about the application of a D.C. voltage to the take-up motor for braking force and a low A.C. voltage to the cartridge motor for keeping a slight tension on the tape.

As the search control is moved in a clockwise direction from its center position, the circuit from the take-up motor is extended from contact 5 of wafer 288 through rotor segment 295, contact 298 of switch 291, contact 235 of play button 232, dropping resistor 304, contact F of switch contact set 291*b* of toggle 291*a*, another dropping resistor 305 and normally closed switch pair 223 to the A.C. bus. Concurrently a circuit is set up to the cartridge motor by way of position 5 of cartridge wafer 289, segment 294 of switch 291, contact 296 of switch 291, a lower set of contacts 235*a* associated with play button 232, contact F of contact set 291*c* of toggle 291*a* to the D.C. bus. Rotating the control to this first clockwise position supplies A.C. voltage to the take-up motor and a D.C. voltage to the cartridge motor thereby interrupting the normal movement of the tape during the play mode. A similar circuit may be traced through contacts 297 and 299 as the search control is rotated in counterclockwise direction to establish a forward search. Consequently, normal tape movement is interrupted as search control 252 is displaced to establish fast tape movement for searching in either direction.

When the search control is displaced in a clockwise direction to the "REV" contact terminals, A.C. voltage is applied to cartridge motor 165 to return the tape to the cartridge and the toggle 291*a* is moved to its "R" or alternate position. A circuit is set up to cartridge motor 165 through contact 5 of wafer 289, rotor segment 294 of switch 291, contact R of switch set 291*b*, voltage dropping resistor 305, and normally closed switch pair 223 to the A.C. bus. The other "REV" contact of switch 291 is associated with segment 295 open circuited at pair 221*a* and take-up motor 164 is de-energized.

After the search has been completed and control 252 is returned to the position represented in FIGURE 14, the take-up motor has a D.C. voltage applied to it. This circuit is completed through wafer 288, segment 295 of switch 291, play switch 235, contact R of set 291*c* of toggle 291*a* and the D.C. bus. The cartridge motor has a low A.C. voltage applied to it by way of search switch wafer segment 294, contact pair 235*a* of the play button, dropping resistor 306, contact R of set 291*b*, dropping resistor 305 and normally closed contact pair 223 to the A.C. bus. The application of these voltages stops tape movement until play button 232 is depressed to resume normal operation.

To search in the forward direction, search control 252 is displaced in a counterclockwise direction and connects with terminals "FWD." When this occurs toggle 291*a* is moved to the "F" position as shown in FIGURE 14. In the forward search condition the take-up motor is energized through wafer 288, the rotor section 295, contact F of set 291*b* of toggle 291*a*, resistor 305 and normally closed switch pair 223 to the A.C. bus. The cartridge motor is de-energized because the "FWD" contact associated with segment 294 is open-circuited at contact 221*b*. After the search has been completed, the search control is returned to the center position indicated in FIGURE 14, and motors 164 and 165 are appropriately energized to stop tape movement. Toggle switch 291*a* again applies D.C. voltage to the reel giving off tape, the cartridge reel, while the remaining reel motor, take-up motor 164, has a low A.C. voltage applied to it. Thus the toggle provides a "memory device" which always applies a D.C. voltage to the reel giving off tape irrespective of the direction of search.

Previously mentioned contact pairs 221*a* and 221*b* of double switch pair 221 are safety devices which impose limits on the search function. These pairs are supported by the structure of the apparatus and are actuated just prior to the reaching of the reference position by carriage 203 of the sensing mechanism 201. When actuated, normally open double contact pair 221 closes and applies full D.C. potential to the reel supplying tape thus overriding the effect of the search control. As previously mentioned the reel which is supplying tape during the search operation is open circuited at either pair 221*a* or 221*b* depending on the direction of search. Application of D.C. voltage to the motor which is free reeling stops the search operation rapidly and imposes limits for searching in both the forward and reverse directions. The play or rewind controls of the tape transport apparatus may then be used to return the instrument to one of its normal operation conditions or alternatively, the search control may be rotated to its other extreme position.

Conductors 301 leading from the pick-up or transcribing head 233 connect with audio or other reproduction systems of conventional construction. Since no claim of novelty is predicated on this signal reproducing circuitry, the circuit arrangement has not been shown.

The described transport apparatus may accommodate a plurality of tape cartridges or a single cartridge as the user desires and avoids certain disadvantages of prior devices in that the user is not required to thread the tape through the instrument. The sensing mechanism in conjunction with the programming system permits the transport to be fully automatic during the play of one or a series of cartridges while reducing to a minimum the manipulative steps required of the user. The sensing mechanism is simplified and is more desirable because of the elimination of moving conductors. Additionally, the instrument has both an automatic and manual reset mechanism for realigning the sensing mechanism in the event of malfunctioning prior to or during transportation of tape.

While a particular embodiment of the invention has been shown and described, it is apparent that changes and modifications may be made without departing from the invention in its broader aspects. The aim of the appended claims, therefore, is to cover all such changes and modifications as fall within the true spirit and scope of the invention.

We claim:

1. Reeling apparatus for winding a continuous flexible tape comprising: a support for receiving a storage reel for said tape; a take-up reel; a transport mechanism for moving said tape between said storage and said take-up reels including first and second alternating current motors; sensing means for continuously indicating the difference in the number of turns of the tape on said storage and said take-up reels independently of the thickness of said tape, said sensing means having an operating cycle containing a single reference point, corresponding to a maximum difference in the number of turns, which it assumes at the start and at the termination of said cycle; driving means for actuating said sensing means concurrently with the operation of said transport mechanism; a source of alternating current potential; a source of direct current potential; and switch means controlled by said sensing means for selectively connecting said alternating current and direct current potential sources to said first and said second motors.

2. Reeling apparatus for winding a continuous flexible tape comprising: a support for receiving a storage reel for said tape; a take-up reel; a transport mechanism coupled to said reels having a multi-step operating cycle in the execution of which said tape is transferred from said storage reel to said take-up reel and returned to said storage reel; a programming mechanism for initiating an operating cycle of said tape transport and for controlling the transport in the execution of its operating cycle; sensing means, including a member movable along a given path and a switch actuator coupled thereto, for continuously indicating the difference in the number of turns of said tape on said storage and take-up reels independently of the thickness of said tape; driving means for actuating said transport mechanism and for concurrently tending to displace said member in one direction in accordance with the speed of rotation of one of said reels and tending to displace said member in the opposite direction in accordance with the speed of rotation of the remaining one of said reels to effect a net displacement of said member in a direction determined by the relative speeds of rotation of said reels; switch means positioned for engagement with said switch actuator for controlling the operation of said programming mechanism in accordance with the movement of said switch actuator during normal operating conditions and for controlling the operation of said transport mechanism when the position of the switch actuator corresponds to an abnormal operating condition of the apparatus; and means for selectively restoring said transport mechanism to an operating condition representing a predetermined step of its operating cycle and said sensing and switch means to corresponding operating conditions.

3. Reeling apparatus for winding a continuous flexible tape comprising: a support for receiving a storage reel for said tape; a take-up reel; a transport mechanism coupled to said reels and having a multi-step operating cycle in the execution of which said tape is transferred from said storage reel to said take-up reel and returned to said storage reel; a programming mechanism for initiating an operating cycle of said tape transport and for controlling the transport in the execution of its operating cycle; sensing means for actuating said programming mechanism including a unitary control member movable along a given path in accordance with the differential speed of said supply and take-up reels and in predetermined time relation to the execution of the operating cycle of said transport mechanism for normal operating conditions of the apparatus; means for biasing said control member to a predetermined position along its path; and means for rendering said biasing means effective to correlate the position of the control member with a predetermined step of the operating cycle of said transport mechanism.

4. Reeling apparatus for winding a continuous flexible tape comprising: a support for receiving a storage reel for said tape; a take-up reel; a transport mechanism coupled to said reels and having a multi-step operating cycle in the execution of which said tape is transferred from said storage reel to said take-up reel and returned to said storage reel; a programming mechanism for initiating an operating cycle of said tape transport and for controlling said transport in the execution of its operating cycle; sensing means, including a lead screw element and a complementary element in threaded engagement therewith, for continuously indicating the difference in the number of turns on said storage and said take-up reels independently of the thickness of said tape; driving means for actuating said transport mechanism and for rotating said elements concurrently with said supply and take-up reels to displace said lead screw along a path in accordance with the differential speed of said supply and take-up reels; means for biasing said lead screw element to a predetermined position along its path; and means for disengaging said lead screw element from said complementary element to render said biasing means effective to correlate the position of the lead screw with a predetermined step in the operating cycle of said transport mechanism.

5. In a tape recorder adapted for automatically playing a series of recorded tape cartridges, reeling apparatus for winding a continuous flexible tape from a cartridge supply reel to a take-up reel throughout a playing cycle of a duration determined by the length of said tape, said reeling apparatus comprising: a transport mechanism including a capstan for transporting said tape at a constant linear rate from said supply reel to said take-up reel throughout said playing cycle, whereby said reels rotate at varying rotational speeds dependent upon the instantaneous apportionment of said tape therebetween; a control member movable along a predetermined path; means, including a drive member coupled to one of said reels and to said control member and a lost motion coupling between the other of said reels and said control member, for moving said control member along said predetermined path during said playing cycle at a rate and in a direction instantaneously proportional to the difference between said rotational speeds of said reels; an actuator coupled to said control member and movable therewith along said predetermined path from a predetermined reference position at the start of said playing cycle through a position displaced from said reference position and back to said reference position at the end of said playing cycle; and a control device responsive to said return of said actuator to said predetermined reference position to control the operation of said transport mechanism.

6. In a tape recorder adapted for automatically playing a series of recorded tape cartridges, reeling apparatus for winding a continuous flexible tape from a cartridge supply reel to a take-up reel throughout a playing cycle of a duration determined by the length of said tape, said reeling apparatus comprising: a transport mechanism including a capstan for transporting said tape at a constant linear rate from said supply reel to said take-up reel throughout said playing cycle, whereby said reels rotate at varying rotational speeds dependent upon the instantaneous apportionment of said tape therebetween; a longitudinally movable lead screw; means, including a drive member coupled to one of said reels and to said lead screw and a slidable coupling between the other of said reels and said lead screw, for moving said lead screw longitudinally during said playing cycle at a rate and in a direction instantaneously proportional to the difference between said rotational speeds of said reels; an actuator coupled to said lead screw and movable longitudinally therewith from a predetermined reference position at the start of said playing cycle through a position longitudinally displaced from said reference position and back to said reference position at the end of said playing cycle; and a control device responsive to said return of said actuator to said predetermined reference position to control the operation of said transport mechanism.

7. In a tape recorder adapted for automatically playing a series of recorded tape cartridges, reeling apparatus for winding a continuous flexible tape from a cartridge supply reel to a take-up reel throughout a playing cycle of a duration determined by the length of said tape, said reeling apparatus comprising: a transport mechanism including a capstan for transporting said tape at a constant linear rate from said supply reel to said take-up reel throughout said playing cycle, whereby said reels rotate at varying rotational speeds dependend upon the instantaneous apportionment of said tape therebetween; a longitudinally movable lead screw rotated from one of said reels; means including a drive member rotated from the other of said reels and having said lead screw threadably engaged thereto, the rotation of said lead screw and said drive member tending to displace said lead screw in opposite longitudinal directions resulting in a net displacement at a rate and in a direction instantaneously proportional to the difference between said rotational speeds of said reels; an actuator coupled to said lead screw and movable longitudinally therewith from a predetermined reference position at the start of said playing cycle through a position longitudinally displaced from said reference position and back to said reference position at the end of said playing cycle; and a control device responsive to said return of said actuator to said predetermined reference position to control the operation of said transport mechanism.

8. In a tape recorder adapted for automatically playing a series of recorded tape cartridges, reeling apparatus for winding a continuous flexible tape from a cartridge supply reel to a take-up reel throughout a playing cycle of a duration determined by the length of said tape, said reeling apparatus comprising: a transport mechanism including a capstan for transporting said tape at a constant linear rate from said supply reel to said take-up reel throughout said playing cycle, whereby said reels rotate at varying rotational speeds dependent upon the instantaneous apportionment of said tape therebetween; a control member movable along a predetermined path; means, including a drive member coupled to one of said reels and to said control member and a lost motion coupling between the other of said reels and said control member, for moving said control member along said predetermined path during said playing cycle at a rate and in a direction instantaneously proportional to the difference between said rotational speeds of said reels; an actuator coupled to said control member and movable therewith along said predetermined path from a predetermined reference position at the start of said playing cycle through a position displaced from said reference position and back to said reference position at the end of said playing cycle, the movement along said predetermined path having a predetermined correlation to the apportionment of tape between said reels during normal operating conditions, but subject to an improper correlation upon the occurrence of an abnormal operating condition; and means for resetting said control member to said reference position after the occurrence of said abnormal operating condition.

References Cited in the file of this patent

UNITED STATES PATENTS

| | | |
|---|---|---|
| 2,252,805 | Gruden | Aug. 19, 1941 |
| 2,611,550 | Nygaard | Sept. 23, 1952 |
| 2,661,163 | Greene | Dec. 1, 1953 |
| 2,941,739 | Burke et al. | June 21, 1960 |